US009625350B2

(12) United States Patent
Sugimoto

(10) Patent No.: US 9,625,350 B2
(45) Date of Patent: Apr. 18, 2017

(54) REFRACTIVE INDEX DISTRIBUTION MEASURING METHOD, REFRACTIVE INDEX DISTRIBUTION MEASURING APPARATUS, AND METHOD FOR MANUFACTURING OPTICAL ELEMENT

(71) Applicant: CANON KABUSHIKI KAISHA, Tokyo (JP)

(72) Inventor: Tomohiro Sugimoto, Yoshikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 14/574,155

(22) Filed: Dec. 17, 2014

(65) Prior Publication Data

US 2015/0177095 A1    Jun. 25, 2015

(30) Foreign Application Priority Data

Dec. 25, 2013  (JP) ................................. 2013-267153

(51) Int. Cl.
*G01N 21/41*    (2006.01)
*G01M 11/02*    (2006.01)

(52) U.S. Cl.
CPC .... *G01M 11/0271* (2013.01); *G01M 11/0285* (2013.01)

(58) Field of Classification Search
CPC ......... G01M 11/0271; G01M 11/0285; G01M 11/0228; G01M 11/0235; G01N 21/45; G01B 9/02024; G01B 9/02007
USPC ................................................ 356/515, 517
See application file for complete search history.

(56) References Cited

U.S. PATENT DOCUMENTS

| | | | |
|---|---|---|---|
| 4,565,449 A * | 1/1986 | Grego | G01N 21/45 356/484 |
| 5,151,752 A | 9/1992 | Oono et al. | |
| 8,472,014 B2 | 6/2013 | Sugimoto | |
| 2006/0159332 A1* | 7/2006 | Sawada | G01M 11/0228 382/141 |
| 2012/0241989 A1* | 9/2012 | Sugimoto | G01M 11/0228 264/1.1 |

* cited by examiner

*Primary Examiner* — Tarifur Chowdhury
*Assistant Examiner* — Jonathon Cook
(74) *Attorney, Agent, or Firm* — Canon USA Inc., IP Division

(57) ABSTRACT

A refractive index distribution measuring method includes dividing light emitted from a light source into reference light and test light, causing the reference light to interfere with the test light, which test light has passed through a test object, measuring a phase difference between the reference light and the test light for each of first and second wavelengths, and measuring a wavefront aberration of the test light for each of the first and second wavelengths. The refractive index distribution measuring method further includes calculating a phase-difference difference amount, which is a difference between the phase differences for the first wavelength and the second wavelength, calculating a wavefront aberration difference amount, which is a difference between the wavefront aberrations for the first wavelength and the second wavelength, and calculating a refractive index distribution of the test object based on the phase-difference difference amount and the wavefront aberration difference amount.

16 Claims, 6 Drawing Sheets

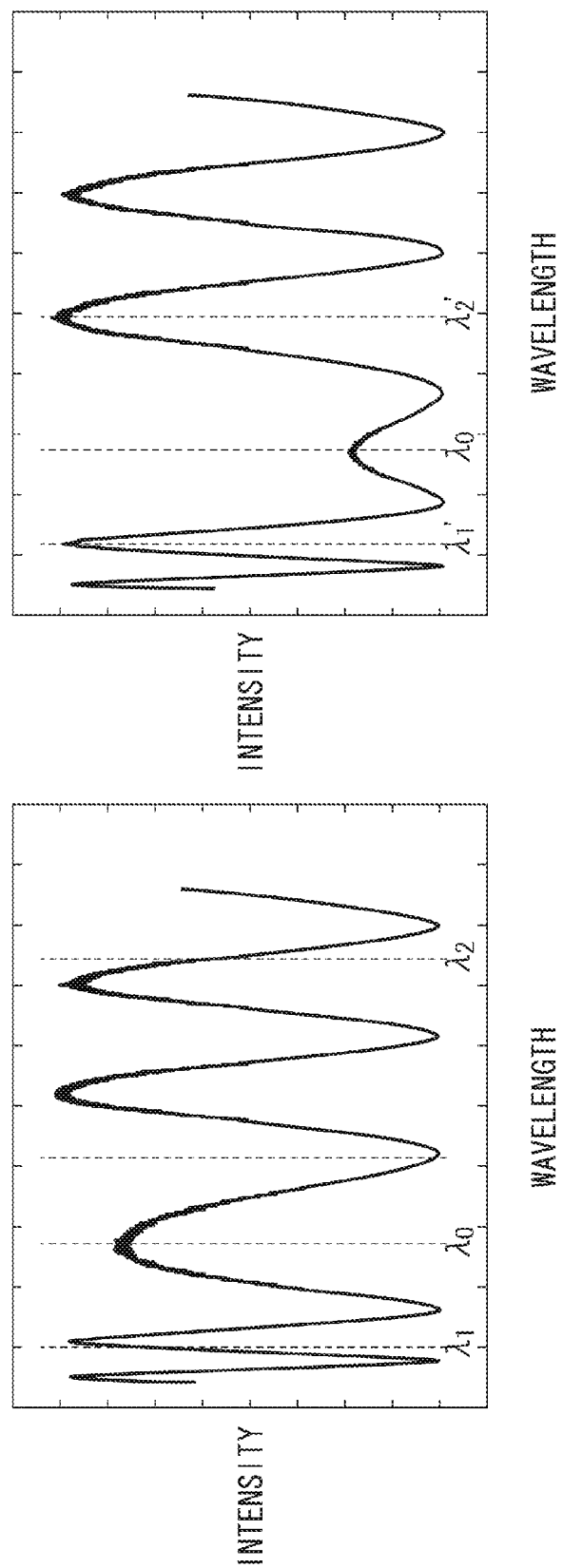

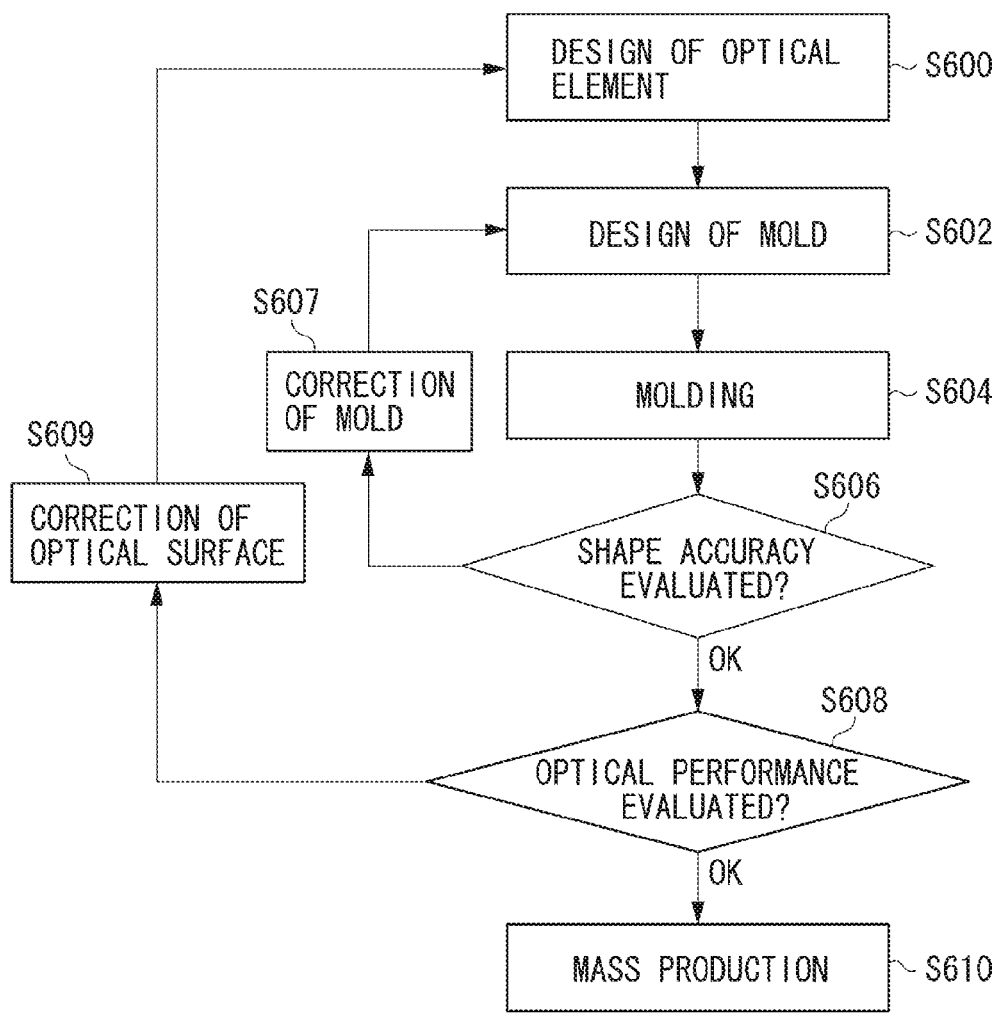

REFRACTIVE INDEX DISTRIBUTION MEASURING METHOD, REFRACTIVE INDEX DISTRIBUTION MEASURING APPARATUS, AND METHOD FOR MANUFACTURING OPTICAL ELEMENT

BACKGROUND OF THE INVENTION

Field of the Invention

The present invention relates to a refractive index distribution measuring method and a refractive index distribution measuring apparatus for measuring a refractive index distribution of an optical element.

Description of the Related Art

Mold-based lens manufacturing methods offer an advantage of expedited mass production of optical lenses, but may cause a refractive index distribution within a lens. The refractive index distribution caused within a lens adversely affects an optical performance of the lens. Therefore, the method of manufacturing lenses by mold requires a technique to non-destructively measure a refractive index distribution within a lens manufactured by molding.

A measuring method discussed in U.S. Pat. No. 5,151,752 includes immersing a test object and a glass sample, the refractive index and the shape of which are known, in a first matching fluid having a refractive index approximately equal to the refractive index of the test object, allowing light to pass through them, and thus measuring interference fringes. The measuring method further includes immersing the test object and the glass sample in a second matching fluid having a refractive index slightly different from the refractive index of the first matching fluid, allowing light to pass through them and thus measuring interference fringes. Then, according to this measuring method, the shape and the refractive index distribution of the test object are obtained based on the result of measurement using the first matching fluid and the result of measurement using the second matching fluid. The refractive index of each of the first and second matching fluids is required to slightly differ from the refractive index of the test object to the extent that the interference fringes do not become too dense.

A measuring method discussed in U.S. Pat. No. 8,472,014 includes arranging a test object in a medium having a refractive index different from the refractive index of the test object, and measuring a first transmitted wavefront for a first wavelength and a second transmitted wavefront for a second wavelength different from the first wavelength. Then, according to this measuring method, the refractive index distribution of the test object is calculated by removing a shape component of the test object using results of measurement of the first transmitted wavefront and the second transmitted wavefront and respective transmitted wavefronts for the first wavelength and the second wavelength of a reference test object arranged in the medium, the reference test object having the same shape as the test object and a specific refractive index distribution.

The measuring method discussed in U.S. Pat. No. 5,151,752 requires a matching fluid having a refractive index approximately equal to the refractive index of the test object. However, a matching fluid having a high refractive index is low in transmittance. Therefore, the measuring method discussed in U.S. Pat. No. 5,151,752, when measuring interference fringes occurring in an optical element having a high refractive index, allows only a small signal to be output from a detector, and thus becomes low in measurement accuracy.

The measuring method discussed in U.S. Pat. No. 8,472,014 is based on the premise that the refractive index (phase refractive index) of the reference test object is known. The phase refractive index of the reference test object needs to coincide with the phase refractive index of a point (for example, the center of a lens) within the test object. Therefore, the refractive index distribution measuring method discussed in U.S. Pat. No. 8,472,014 requires a technique to non-destructively measure the phase refractive index of a point within the test object. However, it is difficult to measure the phase refractive index in a non-destructive manner. A low coherence interference method and a wavelength scanning interference method are may be used to measure the refractive index in a non-destructive manner, but the measured refractive index is not a phase refractive index but a group refractive index. The phase refractive index and the group refractive index are not in one-to-one correspondence with each other, so that a phase refractive index obtained by converting a group refractive index contains a conversion error.

The phase refractive index $N_p(\lambda)$ is a refractive index related to the phase velocity $v_p(\lambda)$, which is the moving velocity of the equiphase surface of light. The group refractive index $N_g(\lambda)$ is a refractive index related to the moving velocity $v_g(\lambda)$ of energy of light (the moving velocity of a wave packet).

SUMMARY OF THE INVENTION

The present invention is directed, among other aspects, to a refractive index distribution measuring method and a refractive index distribution measuring apparatus that are capable of non-destructively and accurately measure a refractive index distribution of a test object.

According to an aspect of the present invention, a refractive index distribution measuring method includes a phase difference measuring step of dividing light emitted from a light source into reference light and test light and causing the reference light to interfere with the test light, which test light has entered a test object and has passed through the test object, to measure a phase difference between the reference light and the test light, a wavefront aberration measuring step of measuring a wavefront aberration of the test light, and a calculation step of calculating a refractive index distribution of the test object based on the phase difference and the wavefront aberration, wherein the phase difference measuring step includes measuring a first phase difference for a first wavelength and a second phase difference for a second wavelength different from the first wavelength, wherein the wavefront aberration measuring step includes measuring a first wavefront aberration for the first wavelength and a second wavefront aberration for the second wavelength, and wherein the calculation step includes calculating a phase-difference difference amount, which is a difference between the first phase difference and the second phase difference, calculating a wavefront aberration difference amount, which is a difference between the first wavefront aberration and the second wavefront aberration, and calculating the refractive index distribution of the test object based on the phase-difference difference amount and the wavefront aberration difference amount.

According to another aspect of the present invention, a method for manufacturing an optical element includes a step of molding the optical element, and a step of evaluating an optical performance of the molded optical element by measuring a refractive index distribution of the optical element using the above-mentioned refractive index distribution measuring method.

According to yet another aspect of the present invention, a refractive index distribution measuring apparatus includes a light source configured to emit light having a plurality of wavelengths, a phase difference measuring unit configured to divide the light emitted from the light source into reference light and test light, to cause the reference light to interfere with the test light, which has entered a test object and has passed through the test object, and to measure a phase difference between the reference light and the test light, a wavefront aberration measuring unit configured to measure a wavefront aberration of the test light, and a calculation unit configured to calculate a refractive index distribution of the test object based on the phase difference and the wavefront aberration, wherein the phase difference measuring unit measures a first phase difference for a first wavelength and a second phase difference for a second wavelength different from the first wavelength, wherein the wavefront aberration measuring unit measures a first wavefront aberration for the first wavelength and a second wavefront aberration for the second wavelength, and wherein the calculation unit calculates a phase-difference difference amount, which is a difference between the first phase difference and the second phase difference, calculates a wavefront aberration difference amount, which is a difference between the first wavefront aberration and the second wavefront aberration, and calculates the refractive index distribution of the test object based on the phase-difference difference amount and the wavefront aberration difference amount.

Further features of the present invention will become apparent from the following description of exemplary embodiments with reference to the attached drawings.

BRIEF DESCRIPTION OF THE DRAWINGS

FIGS. 3A and 3B illustrate interference signals detected by a detector with wavelengths varied by a monochromator.

FIG. 6 illustrates a manufacturing process in a method for manufacturing an optical element according to a third exemplary embodiment of the present invention.

DESCRIPTION OF THE EMBODIMENTS

Various exemplary embodiments, features, and aspects of the invention will be described in detail below with reference to the drawings.

Figure 1:
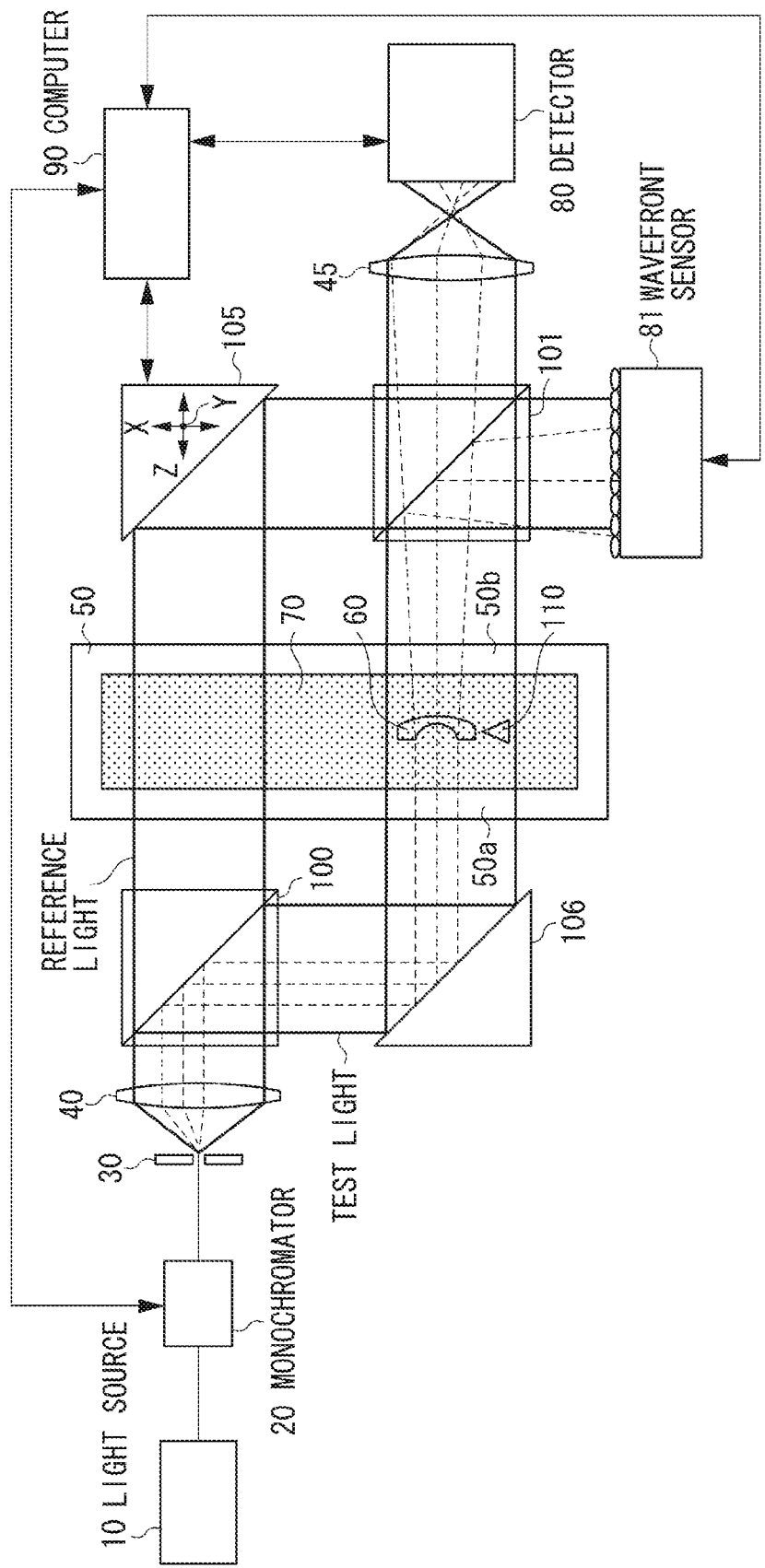
FIG. 1 illustrates a schematic configuration of a refractive index distribution measuring apparatus according to a first exemplary embodiment of the present invention.

FIG. 1 illustrates a schematic configuration of a refractive index distribution measuring apparatus according to a first exemplary embodiment of the present invention. The refractive index distribution measuring apparatus according to the present exemplary embodiment is configured based on a Mach-Zehnder interferometer. The refractive index distribution measuring apparatus includes a light source 10, an interference optical system, a container 50, which is capable of stowing a test object 60 and a medium 70, a detector 80, a wavefront sensor 81, and a computer 90, and measures a refractive index distribution of the test object 60. In the present exemplary embodiment, the test object 60 is a refractive optical element, such as a lens and a flat plate. The refractive index of the medium 70 does not need to coincide with the refractive index of the test object 60.

The light source 10 is a light source capable of emitting light having a plurality of wavelengths, such as a supercontinuum light source. The light having a plurality of wavelengths becomes quasi monochromatic light after passing through a monochromator 20 (a device that can produce light substantially monochromatic). The light having passed through the monochromator 20 becomes divergent waves after passing through a pinhole 30 and then becomes parallel light after passing through a collimator lens 40.

The interference optical system includes beam splitters 100 and 101 and mirrors 105 and 106. The interference optical system divides the light having passed through the collimator lens 40 into reference light, which does not pass through the test object 60, and test light, which passes through the test object 60, causes the reference light and the test light to interfere with each other, and guides the resultant interference light to the detector 80. The interference optical system further guides the test light to the wavefront sensor 81.

In the container 50, there are stowed the test object 60, the medium 70, and a glass prism (reference test object) 110. It is desirable that the optical path length of the reference light and the optical path length of the test light within the container 50 are equal to each other with neither the test object 60 nor the glass prism 110 arranged in the container 50. Accordingly, it is desirable that side panels 50a and 50b of the container 50 have the same thickness, are parallel to each other, and are uniform in refractive index.

A part of the test light having entered the container 50 passes through the medium 70 and the test object 60, and another part of the test light passes through the medium 70 and the glass prism 110. On the other hand, the reference light having passed through the beam splitter 100 passes through the side panels of the container 50 and the medium 70 and is then reflected by the mirror 105. The reference light and the test light are combined by the beam splitter 101 to form interference light.

The refractive index of the medium 70 can be calculated from the transmitted wavefront of the glass prism (reference test object) 110, which is arranged within the medium 70 and the refractive index and shape of which are known. The refractive index of the medium 70 can also be calculated based on the temperature of the medium 70, which is detected by a thermometer (not shown), and the temperature coefficient of the refractive index of the medium 70.

The mirror 105 can be driven by a driving mechanism (not illustrated), in any of the desirable directions of arrows X, Y, and Z illustrated in FIG. 1. The driving directions are not limited to the directions of arrows illustrated in FIG. 1, but the mirror may also be arbitrary rotated (inclined) in other directions as long as the optical path length difference between the reference light and the test light can be changed by driving of the mirror 105. The driving mechanism for the mirror 105 is composed of, for example, a microcontrolled piezo stage. The amount of driving of the mirror 105 is measured by a length measuring device (not illustrated), such as a laser displacement meter and an encoder, and is controlled by the computer 90. The optical path length difference between the reference light and the test light can be adjusted by controlling the position of the mirror 105 with the driving mechanism connected to computer 90.

The interference light formed by the beam splitter 101 is detected by the detector 80 (for example, a charge-coupled device (CCD) sensor or a complementary metal-oxide semiconductor (CMOS) sensor) via an imaging lens 45. An interference signal detected by the detector 80 is transmitted to the computer 90. The detector 80 is located in a position conjugate with the positions of the test object 60 and the glass prism 110 with respect to the imaging lens 45.

In the present exemplary embodiment, since the refractive index of the test object 60 is different from that of the medium 70, the majority of interference fringes formed with the test light, which has passed through the test object 60, and the reference light becomes too dense to resolve the interference fringes. Therefore, the detector 80 cannot measure the majority of interference fringes formed with the test light, which has passed through the test object 60, and the reference light. However, in the present exemplary embodiment, the detector 80 does not need to detect all of the interference signals obtained from the light having passed through the test object 60. The detector 80 only has to detect an interference signal obtained from the light having passed through the medium 70 or the glass prism 110 and an interference signal obtained from the light having passed through the center of the test object 60.

A part of the test light having passed through the test object 60 is reflected by the beam splitter 101 and is then detected by the wavefront sensor 81 (for example, a Shack-Hartmann wavefront sensor). A signal detected by the wavefront sensor 81 is sent to the computer 90 and is then calculated as a transmitted wavefront of the test light having passed through the test object 60.

The computer 90, which is composed of a central processing unit (CPU) or the like, includes a calculation unit configured to calculate the refractive index distribution of the test object 60 based on a result of detection by the detector 80 and a result of detection by the wavefront sensor 81, and a control unit configured to control the wavelengths of light that passes through the monochromator 20 and the amount of driving of the mirror 105.

The interference optical system is adjusted in such a manner that the optical path lengths of the reference light and the test light become equal to each other with no test object 60 arranged in the container 50. A method for adjusting the interference optical system is described below.

Referring to FIG. 1, the refractive index distribution measuring apparatus acquires interference signals obtained by causing the reference light and the test light to interfere with each other with no test object 60 arranged on the optical path of the test light. In this instance, the phase difference $\phi_0(\lambda)$ between the reference light and the test light and the interference intensity $I_{\phi 0}(\lambda)$ between the reference light and the test light are expressed by the following equations (1):

$$\phi_0(\lambda) = \frac{2\pi}{\lambda}(-\Delta_0) \quad (1)$$
$$I_{\phi 0}(\lambda) = I_0(1 + \gamma \cos\phi_0(\lambda))$$

where $\lambda$ denotes the wavelength, in air, of light emitted from the light source 10, $\Delta_0$ denotes a difference in optical path length between the reference light and the test light, $I_0$ denotes the sum of the intensity of the reference light and the intensity of the test light, and $\gamma$ denotes the degree of visibility. Equations (1) suggest that, when the difference $\Delta_0$ is not zero, the interference intensity $I_{\phi 0}(\lambda)$ becomes an oscillating function. Therefore, in order to make the optical path lengths of the reference light and the test light equal to each other, the mirror 105 only needs to be driven in such a manner that the interference signals do not become an oscillating function. At this time, the difference $\Delta_0$ becomes zero.

Figure 2:
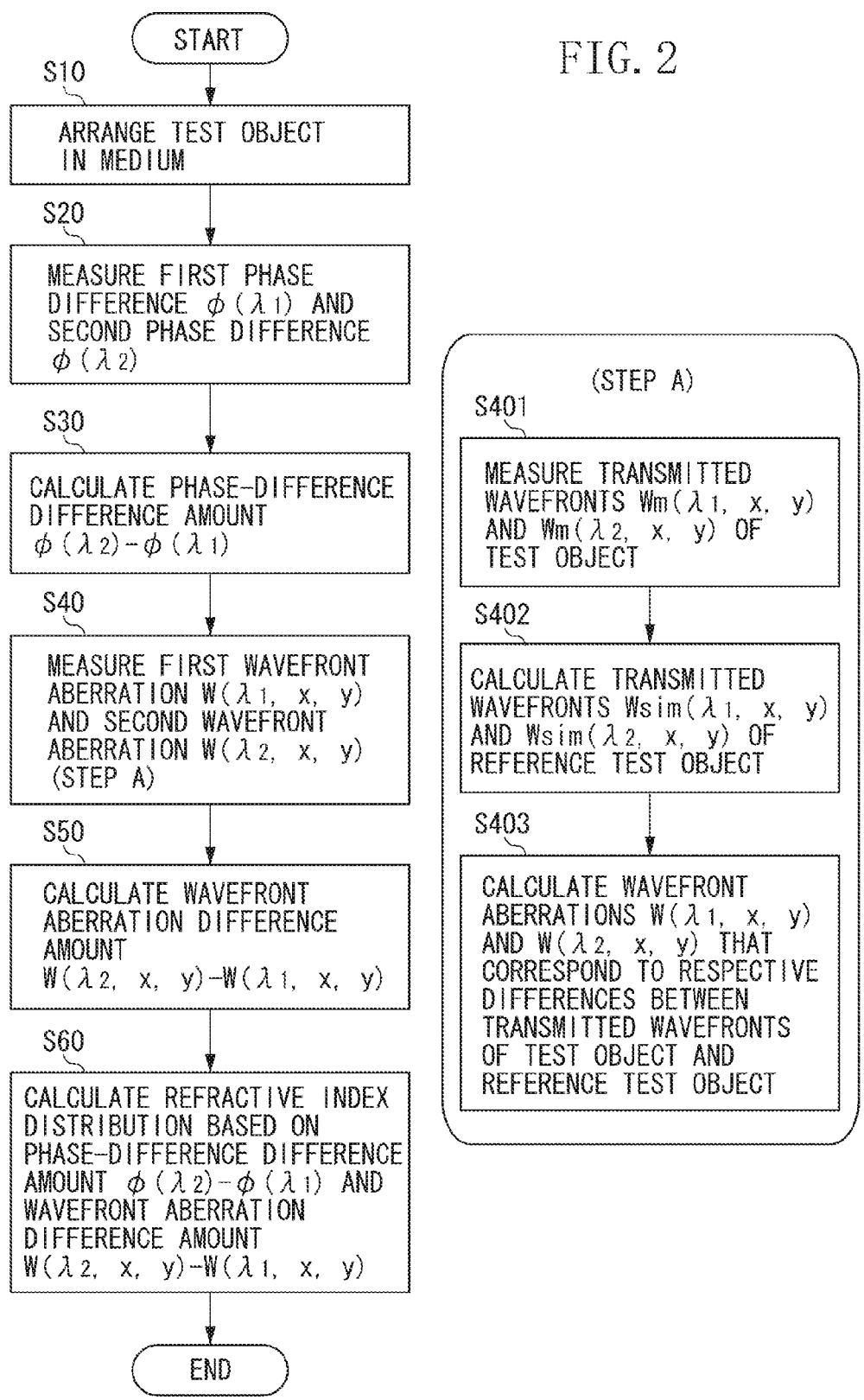
FIG. 2 is a flowchart illustrating a procedure for calculating a refractive index distribution of a test object according to the first exemplary embodiment.

FIG. 2 is a flowchart illustrating a calculation procedure for calculating the refractive index distribution of the test object 60. In step S10, the user arranges the test object 60 on the optical path of the test light. Next, in step S20 (phase difference measuring step), the computer 90 calculates a first phase difference $\phi(\lambda_1)$, which is a phase difference between the reference light and the test light for a first wavelength $\lambda_1$, and a second phase difference $\phi(\lambda_2)$, which is a phase difference between the reference light and the test light for a second wavelength $\lambda_2$. It is desirable that the first wavelength $\lambda_1$ and the second wavelength $\lambda_2$ are different from each other, for example, 450 nm and 650 nm, respectively. A phase difference $\phi(\lambda)$ and an interference intensity $I(\lambda)$ for a wavelength $\lambda$ are expressed by the following equations (2). In the present exemplary embodiment, the phase difference $\phi(\lambda)$ indicates a phase difference between the test light that passes through the center of the lens (test object 60) and the reference light that passes through side panels 50a and 50b of container 50 and through medium 70, but not through the test object.

$$\phi(\lambda) = \frac{2\pi}{\lambda}[(n^{sample}(\lambda, 0, 0) - n^{medium}(\lambda))L(0, 0) - \Delta_0] - 2\pi m(\lambda) \quad (2)$$
$$I(\lambda) = I_0(1 + \gamma\cos\phi(\lambda))$$

where $n^{sample}(\lambda,0,0)$ denotes the refractive index at the center of the test object 60, $n^{medium}(\lambda)$ denotes the refractive index of the medium 70, and $L(0,0)$ denotes the thickness of the center of the test object 60. The phase difference $\phi(\lambda)$ to be measured in this step includes an unknown $2\pi m(\lambda)$ that corresponds to an integral multiple of $2\pi$ (where $m(\lambda)$ denotes an integer that depends on the wavelength $\lambda$).

FIG. 3A illustrates an interference signal in a spectral region that can be measured by the detector 80 illustrated in FIG. 1. The interference signal becomes an oscillating function since the phase difference $\phi(\lambda)$ depends on the wavelength $\lambda$. In FIG. 3A, $\lambda_0$ denotes a wavelength for which the phase difference $\phi(\lambda)$ takes an extreme value. Since the oscillation period of the interference signal becomes long in the vicinity of the wavelength $\lambda_0$, the interference signal can be readily measured. The wavelength $\lambda_0$ can be adjusted by driving the mirror 105 to vary the value of the difference $\Delta_0$.

The phase difference $\phi(\lambda)$ can be measured by using a phase shift method. A method for measuring the phase difference $\phi(\lambda)$ by using the phase shift method is described below. First, the computer 90 acquires an interference signal while driving the mirror 105 by every small amounts. The intensity $I_k(\lambda)$ of the interference light obtained when the phase shift amount (=driving amount×$2\pi/\lambda$) of the mirror 105 is $\delta_k$ ($k$=0, 1, . . . , M−1) is expressed by the following equation (3):

$$I_k(\lambda) = I_0[1+\gamma\cos(\phi(\lambda)-\delta_k)] = a_0 + a_1\cos\delta_k + a_2\sin\delta_k (a_0=I_0, a_1=I_0\gamma\cos\phi(\lambda), a_2=I_0\gamma\sin\phi(\lambda)) \quad (3)$$

When the coefficients $a_0$, $a_1$, and $a_2$ are calculated by using the least-square method, the phase difference $\phi(\lambda)$ is expressed by the following equations (4) using the phase shift amount $\delta_k$ and the interference intensity $I_k(\lambda)$. The calculated phase difference $\phi(\lambda)$ is convoluted with $2\pi$. Therefore, it is necessary to perform an operation for joining phases in a phase jump of $2\pi$ (phase unwrapping).

$$\begin{bmatrix} a_0 \\ a_1 \\ a_2 \end{bmatrix} = \qquad (4)$$

$$\begin{bmatrix} M & \sum_{k=0}^{M-1}\cos\delta_k & \sum_{k=0}^{M-1}\sin\delta_k \\ \sum_{k=0}^{M-1}\cos\delta_k & \sum_{k=0}^{M-1}\cos^2\delta_k & \sum_{k=0}^{M-1}\cos\delta_k\sin\delta_k \\ \sum_{k=0}^{M-1}\sin\delta_k & \sum_{k=0}^{M-1}\cos\delta_k\sin\delta_k & \sum_{k=0}^{M-1}\sin^2\delta_k \end{bmatrix}^{-1} \begin{bmatrix} \sum_{k=0}^{M-1} I_k \\ \sum_{k=0}^{M-1} I_k\cos\delta_k \\ \sum_{k=0}^{M-1} I_k\sin\delta_k \end{bmatrix}$$

$$\phi(\lambda) = \tan^{-1}\frac{a_2}{a_1}$$

With the above-described calculation, the first phase difference $\phi(\lambda_1)$ for the first wavelength $\lambda_1$ and the second phase difference $\phi(\lambda_2)$ for the second wavelength $\lambda_2$ are calculated as expressed by the following equations (5):

$$\phi(\lambda_1) = \frac{2\pi}{\lambda_1}[(n^{sample}(\lambda_1,0,0) - n^{medium}(\lambda_1))L(0,0) - \Delta_0] - 2\pi m(\lambda_1) \qquad (5)$$

$$\phi(\lambda_2) = \frac{2\pi}{\lambda_2}[(n^{sample}(\lambda_2,0,0) - n^{medium}(\lambda_2))L(0,0) - \Delta_0] - 2\pi m(\lambda_2)$$

Referring back to FIG. 2, in step S30, the computer 90 calculates a phase-difference difference amount $\phi(\lambda_2)-\phi(\lambda_1)$, which is a difference between the first phase difference $\phi(\lambda_1)$ and the second phase difference $\phi(\lambda_2)$. The phase-difference difference amount $\phi(\lambda_2)-\phi(\lambda_1)$ is expressed by the following equation (6):

$$\phi(\lambda_2)-\phi(\lambda_1) = 2\pi\left\{\left[\left(\frac{n^{sample}(\lambda_2,0,0)}{\lambda_2} - \frac{n^{sample}(\lambda_1,0,0)}{\lambda_1}\right) - \left(\frac{n^{medium}(\lambda_2)}{\lambda_2} - \frac{n^{medium}(\lambda_1)}{\lambda_1}\right)\right]L(0,0) - \left(\frac{1}{\lambda_2}-\frac{1}{\lambda_1}\right)\Delta_0\right\} - 2\pi(m(\lambda_2)-m(\lambda_1)) \qquad (6)$$

Although the integer $m(\lambda_1)$ and the integer $m(\lambda_2)$ are unknowns, the integer $m(\lambda_2)-m(\lambda_1)$, which is a difference between the integer $m(\lambda_1)$ and the integer $m(\lambda_2)$, can be calculated from the interference signal illustrated in FIG. 3A. When the first wavelength $\lambda_1$ and the second wavelength $\lambda_2$ are the respective wavelengths illustrated in FIG. 3A, there is a difference for one period between the first wavelength $\lambda_1$ and the wavelength $\lambda_0$, for which the phase difference $\phi(\lambda)$ takes an extreme value, and there is a difference for two periods between the second wavelength $\lambda_2$ and the wavelength $\lambda_0$. Thus, the equations $|m(\lambda_1)-m(\lambda_0)|=1$ and $|m(\lambda_2)-m(\lambda_0)|=2$ hold. Whether the extreme value $\phi(\lambda_0)$ is a maximum value or a minimum value can be calculated from the design values of the test object 60 and the measuring conditions for the refractive index, etc., of the medium 70. When the extreme value $\phi(\lambda_0)$ is a maximum value, the difference integers become as follows: $m(\lambda_1)-m(\lambda_0)=-1$ and $m(\lambda_2)-m(\lambda_0)=-2$, so that the difference integer can be calculated as $m(\lambda_2)-m(\lambda_1)=-1$.

The phase-difference difference amount $\phi(\lambda_2)-\phi(\lambda_1)$ in equation (6) is a physical quantity related to the refractive index $n^{sample}(\lambda_1,0,0)$ for the first wavelength $\lambda_1$ and the refractive index $n^{sample}(\lambda_2,0,0)$ for the second wavelength $\lambda_2$ of the test object 60. A physical quantity $f(\lambda_1,\lambda_2)$ expressed by the following equation (7) is obtained by transforming the equation (6) to make the relationship between the refractive index $n^{sample}(\lambda_1,0,0)$ and the refractive index $n^{sample}(\lambda_2,0,0)$ understandable.

$$f(\lambda_1,\lambda_2) = \frac{n^{sample}(\lambda_2,0,0)}{\lambda_2} - \frac{n^{sample}(\lambda_1,0,0)}{\lambda_1} \qquad (7)$$

$$= \frac{n^{medium}(\lambda_2)}{\lambda_2} - \frac{n^{medium}(\lambda_1)}{\lambda_1} + \frac{1}{L(0,0)}$$

$$\left[\frac{\phi(\lambda_2)-\phi(\lambda_1)}{2\pi} + (m(\lambda_2)-m(\lambda_1)) + \left(\frac{1}{\lambda_2}-\frac{1}{\lambda_1}\right)\Delta_0\right]$$

Subsequently, in step S40 (wavefront aberration measuring step), the computer 90 measures, via the wavefront sensor 81, a wavefront aberration $W(\lambda_1,x,y)$ of the test object 60 for the first wavelength $\lambda_1$ and a wavefront aberration $W(\lambda_2,x,y)$ of the test object 60 for the second wavelength $\lambda_2$. In the present exemplary embodiment, a method for measuring wavefront aberrations is performed according to step A illustrated in FIG. 2.

Figure 4A:
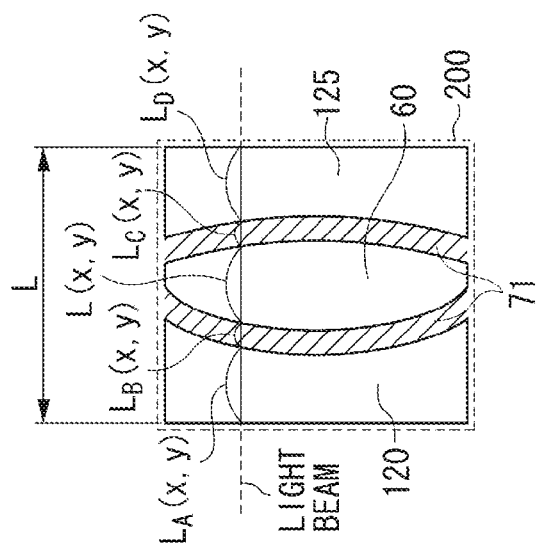
FIGS. 4A, 4B, and 4C illustrate a coordinate system defined on the test object and optical paths of light beams within the refractive index distribution measuring apparatus.
Figure 4B:
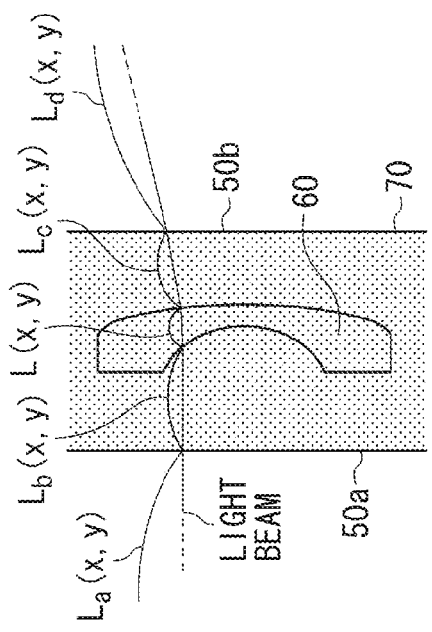

First, in step S401, the computer 90 measures a transmitted wavefront $W_m(\lambda_1,x,y)$ of the test object 60 for the first wavelength $\lambda_1$ and a transmitted wavefront $W_m(\lambda_2,x,y)$ of the test object 60 for the second wavelength $\lambda_2$. To measure transmitted wavefronts of the test object 60, since the test light that does not pass through the test object 60 and the reference light are unnecessary, an aperture or shutter (not illustrated) is arranged to block unnecessary light from entering the wavefront sensor 81. A transmitted wavefront $W_m(\lambda,x,y)$ of the test object 60 for the wavelength $\lambda$ that passes through a point (x,y) within the test object 60 illustrated in FIG. 4A is expressed by the following equations (8):

$$w_m(\lambda,x,y) = \frac{2\pi}{\lambda}[L_a(x,y) + n^{medium}(\lambda)L_b(x,y) + n^{sample}(\lambda,x,y)L(x,y) + n^{medium}(\lambda)L_c(x,y) + L_d(x,y)] \qquad (8)$$

$$W_m(\lambda,x,y) = w_m(\lambda,x,y) - w_m(\lambda,0,0)$$

where $L_a(x,y)$, $L_b(x,y)$, $L_c(x,y)$, and $L_d(x,y)$ are geometric distances between respective constituent elements arranged along a light beam illustrated in FIG. 4B. The light beam illustrated in FIG. 4B is a light beam that passes through the point (x,y) within the test object 60 illustrated in FIG. 4A. $L(x,y)$ denotes a geometric distance on the optical path of the light beam within the test object 60, in other words, a thickness of the test object 60 in the direction of the light beam. $n^{sample}(\lambda,x,y)$ denotes the refractive index of the test object 60 for the wavelength $\lambda$. In equations (8), for simplicity, the thickness of each of the side panels 50a and 50b of the container 50 is neglected.

Then, in step S402, the computer 90 calculates a transmitted wavefront $W_{sim}(\lambda_1,x,y)$ for the first wavelength $\lambda_1$ and a transmitted wavefront $W_{sim}(\lambda_2,x,y)$ for the second wavelength $\lambda_2$ of a reference test object that has a specific refractive index distribution. This step is used to calculate the transmitted wavefronts with the assumption that a reference test object having the same shape as the test object 60 and having a uniform refractive index distribution is located in the position of the test object 60 in step S401.

To calculate the transmitted wavefronts of the reference test object, it is necessary to input the phase refractive index of the reference test object. It is ideal that the phase refractive index of the reference test object coincides with the phase refractive index of any one point within the test object 60. For example, in a case where the phase refractive index of the reference test object coincides with the phase refractive index $n^{sample}(\lambda,0,0)$ of the center of the test object 60, the transmitted wavefront $W_{sim}(\lambda,x,y)$ of the reference test object for the wavelength $\lambda$ is expressed by the following equations (9). Furthermore, by calculating a difference between the equations (8) and the equations (9), the refractive index distribution $GI(\lambda,x,y)$ of the test object 60 is calculated as expressed by the following equation (10).

$$w_{sim}(\lambda, x, y) = \frac{2\pi}{\lambda}[L_a(x, y) + n^{medium}(\lambda)L_b(x, y) + \quad (9)$$
$$n^{sample}(\lambda, 0, 0)L(x, y) + n^{medium}(\lambda)L_c(x, y) + L_d(x, y)]$$
$$W_{sim}(\lambda, x, y) = w_{sim}(\lambda, x, y) - w_{sim}(\lambda, 0, 0)$$

$$GI(\lambda, x, y) = n^{sample}(\lambda, x, y) - n^{sample}(\lambda, 0, 0) = \quad (10)$$
$$\frac{\lambda}{2\pi L(x, y)}(W_m(\lambda, x, y) - W_{sim}(\lambda, x, y))$$

Suppose a case where the phase refractive index of the reference test object does not coincide with the phase refractive index $n^{sample}(\lambda,0,0)$ of the center of the test object 60. When the phase refractive index of the reference test object is denoted by $n^{sample}(\lambda,0,0)+\delta n(\lambda)$, the refractive index distribution $GI'(\lambda,x,y)$ of the test object 60 is calculated as expressed by the following equation (11):

$$GI'(\lambda, x, y) = GI(\lambda, x, y) - \delta n(\lambda)\left(1 - \frac{L(0, 0)}{L(x, y)}\right) \quad (11)$$

Since the second term in the right side of equation (11) is a function of the position (x,y), it is understandable that the refractive index distribution $GI'(\lambda,x,y)$ exhibits a distribution profile different from that of the actual refractive index distribution $GI(\lambda,x,y)$. Therefore, to accurately calculate the refractive index distribution of the test object 60, it is necessary to accurately measure the phase refractive index of any one point within the test object 60 (in the present exemplary embodiment, the center of the test object 60). However, it is difficult to measure the phase refractive index of the test object 60 in a non-destructive manner. To deal with this issue, the present exemplary embodiment is configured to reduce a refractive index distribution error deriving from "$\delta n(\lambda)$" by using the following alternative method.

More specifically, the phase refractive index $n^{sample}(\lambda,0,0)+\delta n(\lambda)$ of the reference test object is determined in such a way as to satisfy the relation expressed by the following equations (12). In equations (12), the phase refractive index of the reference test object for the first wavelength $\lambda_1$ is denoted by $n^{sample}(\lambda_1,0,0)+\delta n(\lambda_1)$, and the phase refractive index of the reference test object for the second wavelength $\lambda_2$ is denoted by $n^{sample}(\lambda_2,0,0)+\delta n(\lambda_2)$ $$\frac{n^{sample}(\lambda_2, 0, 0) + \delta n(\lambda_2)}{\lambda_2} - \frac{n^{sample}(\lambda_1, 0, 0) + \delta n(\lambda_1)}{\lambda_1} = f(\lambda_1, \lambda_2) \quad (12)$$
$$\therefore \frac{\delta n(\lambda_2)}{\lambda_2} = \frac{\delta n(\lambda_1)}{\lambda_1}$$

With the use of the phase refractive index of the reference test object determined in equations (12), the transmitted wavefront $W_{sim}(\lambda,x,y)$ of the reference test object is expressed by the following equations (13):

$$w_{sim}(\lambda, x, y) = \frac{2\pi}{\lambda}[L_a(x, y) + n^{medium}(\lambda)L_b(x, y) + \quad (13)$$
$$(n^{sample}(\lambda, 0, 0) + \delta n(\lambda))L(x, y) + n^{medium}(\lambda)L_c(x, y) + L_d(x, y)]$$
$$W_{sim}(\lambda, x, y) = w_{sim}(\lambda, x, y) - w_{sim}(\lambda, 0, 0)$$

In step S403, the computer 90 calculates a wavefront aberration $W(\lambda,x,y)$ that corresponds to a difference between the transmitted wavefront $W(\lambda,x,y)$ of the test object and the transmitted wavefront $W_{sim}(\lambda,x,y)$ of the reference test object, as expressed by the following equation (14):

$$W(\lambda, x, y) = W_m(\lambda, x, y) - W_{sim}(\lambda, x, y) \quad (14)$$
$$= \frac{2\pi}{\lambda}[(n^{sample}(\lambda, x, y) - n^{sample}(\lambda, 0, 0))L(x, y) -$$
$$\delta n(\lambda)(L(x, y) - L(0, 0))]$$

In step S40 according to the above-described step A, the computer 90 measures the first wavefront aberration $W(\lambda_1,x,y)$ of the test object 60 for the first wavelength $\lambda_1$ and the second wavefront aberration $W(\lambda_2,x,y)$ of the test object 60 for the second wavelength $\lambda_2$. The first wavefront aberration $W(\lambda_1,x,y)$ and the second wavefront aberration $W(\lambda_2,x,y)$ are expressed by the following equations (15).

$$W(\lambda_1, x, y) = \frac{2\pi}{\lambda_1}[(n^{sample}(\lambda_1, x, y) - n^{sample}(\lambda_1, 0, 0))L(x, y) - \quad (15)$$
$$\delta n(\lambda_1)(L(x, y) - L(0, 0))]$$
$$W(\lambda_2, x, y) = \frac{2\pi}{\lambda_2}[(n^{sample}(\lambda_2, x, y) - n^{sample}(\lambda_2, 0, 0))L(x, y) -$$
$$\delta n(\lambda_2)(L(x, y) - L(0, 0))]$$

Then, in step S50, the computer 90 calculates a wavefront aberration difference amount $W(\lambda_2,x,y)-W(\lambda_1,x,y)$ as expressed by the following equation (16). Furthermore, with the use of approximate expressions (17), the equation (16) is transformed into the following equation (18).

$$W(\lambda_2, x, y) - W(\lambda_1, x, y) = 2\pi\left[\left(\frac{n^{sample}(\lambda_2, x, y) - n^{sample}(\lambda_2, 0, 0)}{\lambda_2} - \quad (16)\right.\right.$$
$$\frac{n^{sample}(\lambda_1, x, y) - n^{sample}(\lambda_1, 0, 0)}{\lambda_1}\right)L(x, y) -$$
$$\left.\left(\frac{\delta n(\lambda_2)}{\lambda_2} - \frac{\delta n(\lambda_1)}{\lambda_1}\right)(L(x, y) - L(0, 0))\right]$$

-continued $$\frac{n^{sample}(\lambda_2, x, y) - n^{sample}(\lambda_1, x, y)}{n^{sample}(\lambda_1, x, y) - 1} \sim \quad (17)$$

$$\frac{n^{sample}(\lambda_2, 0, 0) - n^{sample}(\lambda_1, 0, 0)}{n^{sample}(\lambda_1, 0, 0) - 1} \sim$$

$$\frac{n^{sample}(\lambda_2, 0, 0) + \delta n(\lambda_2) - n^{sample}(\lambda_1, 0, 0) - \delta n(\lambda_1)}{n^{sample}(\lambda_1, 0, 0) + \delta n(\lambda_1) - 1}$$

$$\therefore n^{sample}(\lambda_2, x, y) - n^{sample}(\lambda_2, 0, 0) =$$

$$\frac{n^{sample}(\lambda_2, 0, 0) + \delta n(\lambda_2) - 1}{n^{sample}(\lambda_1, 0, 0) + \delta n(\lambda_1) - 1}(n^{sample}(\lambda_1, x, y) - n^{sample}(\lambda_1, 0, 0))$$

$$n^{sample}(\lambda_1, x, y) - n^{sample}(\lambda_1, 0, 0) = \quad (18)$$

$$\frac{W(\lambda_2, x, y) - W(\lambda_1, x, y)}{2\pi\left[\left(\frac{n^{sample}(\lambda_2, 0, 0) + \delta n(\lambda_2) - 1}{n^{sample}(\lambda_1, 0, 0) + \delta n(\lambda_1) - 1}\right)\frac{1}{\lambda_2} - \frac{1}{\lambda_1}\right]L(x, y)} +$$

$$\frac{\left(\frac{\delta n(\lambda_2)}{\lambda_2} - \frac{\delta n(\lambda_1)}{\lambda_1}\right)}{\left[\left(\frac{n^{sample}(\lambda_2, 0, 0) + \delta n(\lambda_2) - 1}{n^{sample}(\lambda_1, 0, 0) + \delta n(\lambda_1) - 1}\right)\frac{1}{\lambda_2} - \frac{1}{\lambda_1}\right]}\left(1 - \frac{L(0, 0)}{L(x, y)}\right)$$

The second term in the right side of equation (18) is a refractive index distribution calculation error deriving from "$\delta n(\lambda)$", and corresponds to the second term in equation (11). However, in the present exemplary embodiment, since the phase refractive index of the reference test object is determined in such a way as to satisfy the relation expressed by equations (12), the second term in the right side of equation (18) becomes zero. More specifically, in step S60, the computer 90 calculates the refractive index distribution $GI(\lambda_1, x, y)$ based on equation (7) using the phase-difference difference amount $\phi(\lambda_2) - \phi(\lambda_1)$, equation (12), and equation (16) calculating the wavefront aberration difference amount $W(\lambda_2, x, y) - W(\lambda_1, x, y)$, as expressed by the following equation (19). Furthermore, with the use of equation (17), the computer 90 calculates the refractive index distribution $GI(\lambda_2, x, y)$ for the second wavelength $\lambda_2$ based on the refractive index distribution $GI(\lambda_1, x, y)$ for the first wavelength $\lambda_1$. Incidentally, although "$\delta n(\lambda)$" still remains in the following equations (19), the effect of "$\delta n(\lambda)$" remaining in the form of those equations on the refractive index distribution is negligibly small.

$$GI(\lambda_1, x, y) = n^{sample}(\lambda_1, x, y) - n^{sample}(\lambda_1, 0, 0) \quad (19)$$

$$= \frac{W(\lambda_2, x, y) - W(\lambda_1, x, y)}{2\pi\left[\left(\frac{n^{sample}(\lambda_2, 0, 0) + \delta n(\lambda_2) - 1}{n^{sample}(\lambda_1, 0, 0) + \delta n(\lambda_1) - 1}\right)\frac{1}{\lambda_2} - \frac{1}{\lambda_1}\right]L(x, y)}$$

$$GI(\lambda_2, x, y) = \frac{n^{sample}(\lambda_2, 0, 0) + \delta n(\lambda_2) - 1}{n^{sample}(\lambda_1, 0, 0) + \delta n(\lambda_1) - 1}GI(\lambda_1, x, y)$$

As described above, with the use of two physical quantities that are accurately measurable, i.e., the phase-difference difference amount $\phi(\lambda_2) - \phi(\lambda_1)$ and the wavefront aberration difference amount $W(\lambda_2, x, y) - W(\lambda_1, x, y)$, the refractive index distribution of the test object 60 can be accurately measured in a non-destructive manner.

In the present exemplary embodiment, the computer 90 calculates the refractive index distribution $GI(\lambda_2, x, y)$ for the second wavelength $\lambda_2$ after calculating the refractive index distribution $GI(\lambda_1, x, y)$ for the first wavelength $\lambda_1$. Alternatively, the computer 90 may calculate the refractive index distribution $GI(\lambda_1, x, y)$ for the first wavelength $\lambda_1$ after calculating the refractive index distribution $GI(\lambda_2, x, y)$ for the second wavelength $\lambda_2$ based on equation (16) and equation (17).

In the present exemplary embodiment, the computer 90 calculates the physical quantity $f(\lambda_1, \lambda_2)$ expressed by equation (7) based on the phase-difference difference amount $\phi(\lambda_2) - \phi(\lambda_1)$ expressed by equation (6), and determines the phase refractive index of the reference test object based on the physical quantity $f(\lambda_1, \lambda_2)$. With this, the computer 90 reduces the refractive index distribution error deriving from the error $\delta n(\lambda)$ of the phase refractive index.

A physical quantity used to determine the phase refractive index of the reference test object is not limited to "$f(\lambda_1, \lambda_2)$", but may be any physical quantity calculated from the phase-difference difference amount $\phi(\lambda_2) - \phi(\lambda_1)$. For example, "$g(\lambda_1, \lambda_2)$" or "$h(\lambda_1, \lambda_2)$" in the following equations (20) can be substituted as the physical quantity. Alternatively, without calculating such a physical quantity as "$f(\lambda_1, \lambda_2)$", the computer 90 may directly use a physical quantity in the form of the phase-difference difference amount $\phi(\lambda_2) - \phi(\lambda_1)$.

$$g(\lambda_1, \lambda_2) = n^{sample}(\lambda_1, 0, 0) - \lambda_1\frac{n^{sample}(\lambda_2, 0, 0) - n^{sample}(\lambda_1, 0, 0)}{\lambda_2 - \lambda_1} \quad (20)$$

$$= n^{medium}(\lambda_1) - \lambda_1\frac{n^{medium}(\lambda_2) - n^{medium}(\lambda_1)}{\lambda_2 - \lambda_1} +$$

$$\frac{1}{L(0, 0)}\left\{-\frac{\lambda_1\lambda_2}{\lambda_2 - \lambda_1}\left[\frac{\phi(\lambda_2) - \phi(\lambda_1)}{2\pi} + (m(\lambda_2) - m(\lambda_1))\right] + \Delta_0\right\}$$

$$h(\lambda_1, \lambda_2) = 2\pi(n^{sample}(\lambda_2, 0, 0)\lambda_1 - n^{sample}(\lambda_1, 0, 0)\lambda_2)L(0, 0)$$

$$= 2\pi(n^{medium}(\lambda_2)\lambda_1 - n^{medium}(\lambda_1)\lambda_2)L(0, 0) +$$

$$\lambda_1\lambda_2[\phi(\lambda_2) + \phi(\lambda_1) + 2\pi(m(\lambda_2) - m(\lambda_1))] +$$

$$2\pi(\lambda_1 - \lambda_2)\Delta_0$$

In the present exemplary embodiment, the computer 90 can calculate the refractive index distribution $GI(\lambda_1, x, y)$ even if the value of the refractive index $n^{sample}(\lambda_1, 0, 0)$ of the center of the test object 60 is unknown. In addition, the computer 90 can also calculate the refractive index $n^{sample}(\lambda_1, 0, 0)$ of the center of the actual test object 60 by performing the following calculation.

$\Theta$ expressed by the following equation (21) denotes the square of a difference between the refractive index distribution $GI'(\lambda, x, y)$ calculated based on equation (11) and the refractive index distribution $GI(\lambda_1, x, y)$ calculated based on equation (19). By calculating such a phase refractive index $n^{sample}(\lambda, 0, 0) + \delta n(\lambda)$ of the reference test object as to decrease the value $\Theta$, the computer 90 can also calculate the refractive index $n^{sample}(\lambda_1, 0, 0)$ of the center of the test object 60.

$$\Theta = [GI'(\lambda, x, y) - GI(\lambda, x, y)]^2 \quad (21)$$

Generally, it is difficult to measure the phase refractive index of a test object in a non-destructive manner. However, if the refractive index distribution of the test object is known, it is possible to measure the phase refractive index of the test object in a non-destructive manner by using the method expressed by equation (21). In the present exemplary embodiment, although the computer 90 calculates the refractive index $n^{sample}(\lambda_1, 0, 0)$ of the center of the test object 60 for the first wavelength $\lambda_1$, the computer 90 can also calculate the refractive index $n^{sample}(\lambda_2, 0, 0)$ of the center of the test object 60 for the second wavelength $\lambda_2$ by using the above-described method.

In general, a lens manufactured by grinding or polishing or a lens manufactured by molding, in which the dispersed distribution of refractive indices is not likely to occur, meets the approximate expressions (17). On the other hand, a lens in which the dispersed distribution of refractive indices is intentionally caused to occur to decrease chromatic aberration does not meet the approximate expressions (17). The measurement of the refractive index distribution of a dispersed-distribution lens using the present exemplary embodiment may contain errors, so that care should be taken.

In the present exemplary embodiment, it is presumed that the test object 60 and the reference test object have the same shape L(x,y). If the shape of the test object 60 differs from the shape of the reference test object, the calculated refractive index distribution contains errors. Therefore, it is desirable to measure the shape of the test object 60 in advance by using a sensing-pin measuring method or the like and then apply the measured shape to the shape of the reference test object. Alternatively, it is possible to apply the designed value L(x,y) as the shape of the reference test object and remove a shape error (shape component) δL(x,y) from the designed value of the test object 60. The shape error δL(x,y) can be removed by immersing the test object 60 in each of two types of media different in refractive index (for example, oil with a refractive index of 1.70 as a first medium and oil with a refractive index of 1.75 as a second medium) and performing the flow illustrated in FIG. 2.

When the shape of the test object 60 is L(x,y)+δL(x,y), the k-th phase-difference difference amount $\phi_k(\lambda_2)-\phi_k(\lambda_1)$, which is a difference between the first phase difference and the second phase difference of the test object 60 in the k-th medium, is expressed by the following equation (22), where k=1, 2.

$$\phi_k(\lambda_2) - \phi_k(\lambda_1) = 2\pi \left\{ \left[ \left( \frac{n^{sample}(\lambda_2, 0, 0)}{\lambda_2} - \frac{n^{sample}(\lambda_1, 0, 0)}{\lambda_1} \right) - \left( \frac{n_k^{medium}(\lambda_2)}{\lambda_2} - \frac{n_k^{medium}(\lambda_1)}{\lambda_1} \right) \right] (L(0, 0) + \delta L(0, 0)) - \left( \frac{1}{\lambda_2} - \frac{1}{\lambda_1} \right) \Delta_{0k} \right\} - 2\pi(m_k(\lambda_2) - m_k(\lambda_1)) \quad (k = 1, 2)$$

(22)

$n_k^{medium}(\lambda)$ denotes the refractive index of the k-th medium, $\Delta_{0k}$ denotes the optical path length difference between the reference light and the test light without the test object 60 arranged in the k-th medium, and $m_k(\lambda)$ denotes an integer in the k-th medium. If the shape component L(0,0)+δL(0,0) is removed from the first phase-difference difference amount $\phi_1(\lambda_2)-\phi_1(\lambda_1)$ in the first medium and the second phase-difference difference amount $\phi_2(\lambda_2)-\phi_2(\lambda_1)$ in the second medium, the physical quantity $f(\lambda_1,\lambda_2)$ can be obtained as expressed by the following equation (23):

$$f(\lambda_1, \lambda_2) = \frac{n^{sample}(\lambda_2, 0, 0)}{\lambda_2} - \frac{n^{sample}(\lambda_1, 0, 0)}{\lambda_1} = \frac{\left( \frac{n_1^{medium}(\lambda_2)}{\lambda_2} - \frac{n_1^{medium}(\lambda_1)}{\lambda_1} \right) A_2 - \left( \frac{n_2^{medium}(\lambda_2)}{\lambda_2} - \frac{n_2^{medium}(\lambda_1)}{\lambda_1} \right) A_1}{A_2 - A_1}$$

(23)

$$A_k = \frac{\phi_k(\lambda_2) - \phi_k(\lambda_1)}{2\pi} + (m_k(\lambda_2) - m_k(\lambda_1)) + \left( \frac{1}{\lambda_2} - \frac{1}{\lambda_1} \right) \Delta_{0k} \quad (k = 1, 2)$$

Consider the k-th wavefront aberration difference amount $W_k(\lambda_2,x,y)-W_k(\lambda_1,x,y)$, which is a difference between the first wavefront aberration $W_k(\lambda_1,x,y)$ and the second wavefront aberration $W_k(\lambda_2,x,y)$ of the test object 60 in the k-th medium. When the shape of the test object 60 is L(x,y)+δL(x,y), the k-th wavefront aberration difference amount $W_k(\lambda_2,x,y)-W_k(\lambda_1,x,y)$ is expressed by the following equation (25) using equation (12), equation (23), and the following approximate expression (24).

$$(n^{sample}(\lambda, x, y) - n^{sample}(\lambda, 0, 0) - \delta n(\lambda))\delta L(x, y) \sim 0$$

(24)

$$W_k(\lambda_2, x, y) - W_k(\lambda_1, x, y) = 2\pi \left[ \left( \frac{n^{sample}(\lambda_2, x, y) - n^{sample}(\lambda_2, 0, 0)}{\lambda_2} - \frac{n^{sample}(\lambda_1, x, y) - n^{sample}(\lambda_1, 0, 0)}{\lambda_1} \right) L(x, y) + B_k \delta L(x, y) - B_k \delta L(0, 0) \right]$$

$$B_k = \frac{n^{sample}(\lambda_2, 0, 0) + \delta n(\lambda_2) - n_k^{medium}(\lambda_2)}{\lambda_2} - \frac{n^{sample}(\lambda_1, 0, 0) + \delta n(\lambda_1) - n_k^{medium}(\lambda_1)}{\lambda_1} \quad (k = 1, 2)$$

(25)

The shape components δL(x,y) and δL(0,0) can be removed from the first wavefront aberration difference amount $W_1(\lambda_2,x,y)-W_1(\lambda_1,x,y)$ in the first medium and the second wavefront aberration difference amount $W_2(\lambda_2,x,y)-W_2(\lambda_1,x,y)$ in the second medium. In addition, the refractive index distribution $GI(\lambda_1,x,y)$ is calculated as expressed by the following equation (26) using equation (17)

$$GI(\lambda_1, x, y) = n^{sample}(\lambda_1, x, y) - n^{sample}(\lambda_1, 0, 0) = \frac{(W_1(\lambda_2, x, y) - W_1(\lambda_1, x, y))B_2 - (W_2(\lambda_2, x, y) - W_2(\lambda_1, x, y))B_1}{2\pi(B_2 - B_1) \left[ \left( \frac{n^{sample}(\lambda_2, 0, 0) + \delta n(\lambda_2) - 1}{n^{sample}(\lambda_1, 0, 0) + \delta n(\lambda_1) - 1} \right) \frac{1}{\lambda_2} - \frac{1}{\lambda_1} \right] L(x, y)}$$

(26)

The refractive index of a medium varies with a change of the temperature of the medium. Therefore, even with the use of a single type of medium, the measurement of the refractive index distribution according to the present exemplary embodiment under two temperature values becomes equivalent to the measurement of the refractive index distribution according to the present exemplary embodiment in two types of media different in refractive index. In other words, the first medium and the second medium in the present exemplary embodiment can only differ from each other in refractive index. Two types of media can be used or a single type of medium with different temperature values can also be used. Therefore, the shape component of the test object 60 may be removed using two temperature values.

The effect of the shape error δL(0,0) of the center of the test object 60 on the phase-difference difference amount $\phi(\lambda_2)-\phi(\lambda_1)$ can be reduced by using the following method instead of removing that using two types of media or two temperature values.

The method includes arranging the test object 60 in a medium 70 having a group refractive index equal to the group refractive index of the test object 60 for a specific wavelength, setting the optical path length difference as $\Delta_0 = 0$, and acquiring an interference signal such as that illustrated in FIG. 3B. The interference signal exhibits the wavelength dependency of the phase difference between the reference light and the test light. The wavelength $\lambda_0$ illustrated in FIG. 3B is equivalent to a specific wavelength for which the group refractive index of the test object 60 and the group refractive index of the medium 70 become equal to each other.

If a first wavelength $\lambda_1'$ and a second wavelength $\lambda_2'$, which are at a distance of the same period from the wavelength $\lambda_0$, for which the phase difference $\phi(\lambda)$ takes an extreme value, are selected as illustrated in FIG. 3B, such an equation as $\phi(\lambda_1')=(\lambda_2')$ is obtained. In this instance, the third term in the right side of the following equation (27) becomes zero, and the physical quantity $f(\lambda_1', \lambda_2')$ becomes a value that does not depend on the shape component of the test object 60.

More specifically, the first wavelength $\lambda_1$ and the second wavelength $\lambda_2$ can be selected in such a manner that the phase difference $\phi(\lambda_1')$ for the first wavelength $\lambda_1$ and the phase difference $\phi(\lambda_2')$ for the second wavelength $\lambda_2$ become equal to each other. With this, the effect of the shape error $\delta L(0,0)$ of the center of the test object 60 on the phase-difference difference amount $\phi(\lambda_2)-\phi(\lambda_1)$ can be reduced.

$$f(\lambda_1', \lambda_2') = \frac{n^{sample}(\lambda_2', 0, 0)}{\lambda_2'} - \frac{n^{sample}(\lambda_1', 0, 0)}{\lambda_1'} = \frac{n^{medium}(\lambda_2')}{\lambda_2'} - \frac{n^{medium}(\lambda_1')}{\lambda_1'} + \frac{\phi(\lambda_2') - \phi(\lambda_1')}{2\pi(L(0, 0) + \delta L(0, 0))} \qquad (27)$$

In the present exemplary embodiment, various wavelengths are generated for scanning by a combination of a light source that emits light with a plurality of wavelengths and a monochromator. Although a supercontinuum light source is used as the light source that emits light with a plurality of wavelengths, a superluminescent diode (SLD), a short-pulse laser source, or a halogen lamp can be used instead. A wavelength-swept light source or a multi-line laser that discretely emits light with a plurality of wavelengths may be used instead of the combination of a light source that emits light with a plurality of wavelengths and a monochromator. The light source that emits light with a plurality of wavelengths is not limited to a single light source, but may be a combination of light sources. In the present exemplary embodiment, it is only necessary to use a light source that emits light with two or more wavelengths and that the wavelengths are different from each other to the extent that the difference between wavelengths is measurable.

In the present exemplary embodiment, the computer 90 measures the phase difference at the center of the test object 60 (the coordinates (0,0) illustrated in FIG. 4A). This is because the light that passes through the center of the test object 60 travels straight without deflection and is, therefore, easy to measure. Naturally, the computer 90 may measure the phase difference at an arbitrary coordinate point (x,y) instead of the center of the test object.

In the present exemplary embodiment, a Shack-Hartmann wavefront sensor is used as the wavefront sensor 81. The wavefront sensor 81 may only be a wavefront sensor capable of measuring the transmitted wavefront having large aberration. A wavefront sensor using a Hartmann operation or a wavefront sensor using a shearing interferometer, such as a Talbot interferometer can be used as the wavefront sensor 81.

In the present exemplary embodiment, a Mach-Zehnder interferometer is used in the interference optical system. Alternatively, any interferometer capable of measuring the optical path length difference between the reference light and the test light, such as a Twyman-Green interferometer, can be used instead. Furthermore, in the present exemplary embodiment, the phase difference or the wavefront aberration is calculated as a function of wavelengths, but may be calculated as a function of frequencies.

In the present exemplary embodiment, in equation (6), the integer $m(\lambda_2)-m(\lambda_1)$ is calculated from the interference signal illustrated in FIG. 3A. The integer $m(\lambda_2)-m(\lambda_1)$ is a discrete value, and, therefore, can also be calculated by using the designed value of the test object 60 and the measurement condition, such as the refractive index of the medium 70. In other words, the integer $m(\lambda_2)-m(\lambda_1)$ can be calculated by configuring the measuring apparatus illustrated in FIG. 1 on a computer and using the designed value for calculation, instead of being calculated from the interference signal.

In the present exemplary embodiment, the refractive index distribution of the test object 60 is measured with such a configuration that the test light enters the test object 60 at right angle thereto. However, the refractive index distribution of the test object 60 can also be measured with such a configuration that the test light enters the test object 60 obliquely. The measurement of the refractive index distribution of the test object 60 with the oblique entry configuration enables calculating the refractive index distribution in the optical axis direction of the test object 60.

The optical path length distribution (=refractive index distribution×L(x,y)), which serves as a physical quantity indicating the optical performance of a molded lens, can be substituted for the refractive index distribution. Therefore, the refractive index distribution measuring method (refractive index distribution measuring apparatus) according to the present exemplary embodiment can also be referred to as an optical path length distribution measuring method (optical path length distribution measuring apparatus).

Figure 5:
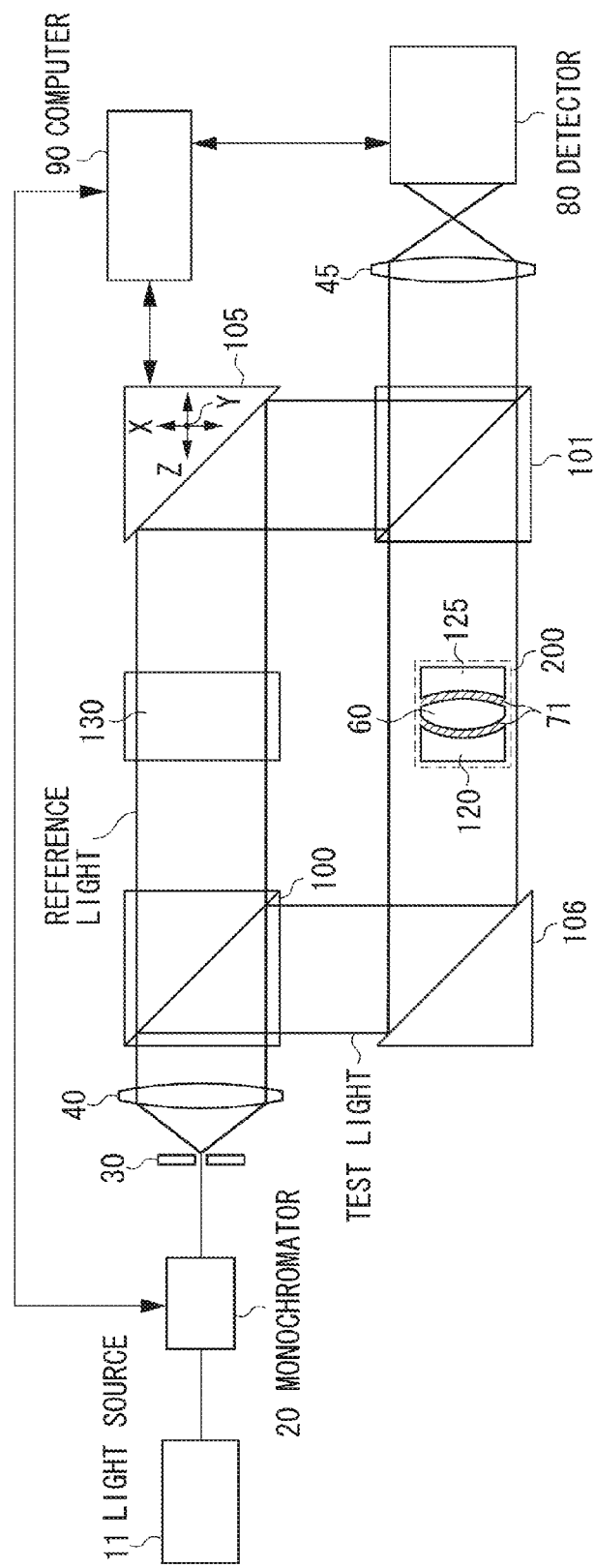
FIG. 5 illustrates a schematic configuration of a refractive index distribution measuring apparatus according to a second exemplary embodiment of the present invention.

A second exemplary embodiment of the present invention is directed to a method for calculating the refractive index distribution of the test object 60 without using the reference test object, which is used in the first exemplary embodiment. FIG. 5 illustrates a schematic configuration of a refractive index distribution measuring apparatus according to the second exemplary embodiment. In FIG. 5, components similar to those of the first exemplary embodiment are assigned with the respective same reference numerals. In the present, second exemplary embodiment, the test object 60 is sandwiched between two types of lenses, so that transmitted light beams that have passed through the test object 60 are made almost parallel. Since the transmitted light beams are almost parallel light beams, any wavefront sensor capable of measuring the wavefront having large aberration, such as a Shack-Hartmann wavefront sensor, is not required, and the wavefront of the transmitted light beams can be detected only with the detector 80, which measures interference fringes between the reference light and the test light.

The light source 11 in the present exemplary embodiment is a multi-line gas laser, which discretely emits light with a plurality of wavelengths (for example, an argon laser or a krypton laser). In the present exemplary embodiment, a Mach-Zehnder interferometer is used to measure the phase difference $\phi(\lambda)$ between the reference light and the test light and the wavefront aberration $W(\lambda,x,y)$.

In the present exemplary embodiment, to eliminate the effect of the refractive power of the test object 60, the test object 60 is sandwiched between a first reference lens 120 and a second reference lens 125, which have respective refractive indices approximately equal to that of the test object 60, via a medium 71. The test object 60, the first reference lens 120, the second reference lens 125, and the medium 71 constitute a test unit 200. The first reference lens 120 has a surface having almost the same shape as the shape of the first surface of the test object 60, and the second reference lens 125 has a surface having almost the same shape as the shape of the second surface of the test object 60. The surface shapes of the test object 60, the first reference lens 120, and the second reference lens 125 and the refractive indices of the first reference lens 120 and the second reference lens 125 are known quantities.

The first reference lens 120 and the second reference lens 125 have refractive index distributions of almost zero, and are manufactured by grinding or polishing. The refractive indices and surface shapes of the test object 60, the first reference lens 120, and the second reference lens 125 need to coincide with one another to the extent that interference fringes measured by the measuring apparatus according to the present exemplary embodiment do not become too dense (to the extent that the interference fringes can be resolved). To decrease the effect of refraction, the medium 71 (for example, oil) is applied between the first reference lens 120 and the test object 60 and between the test object 60 and the second reference lens 125.

The light emitted from the light source 11 is dispersed with wavelengths and is made into quasi monochromatic light by the monochromator 20. Then, the quasi monochromatic light enters the pinhole 30. The wavelength of the quasi monochromatic light is controlled by the computer 90. The light having passed through the pinhole 30 becomes diverging light, which is then made into parallel light by the collimator lens 40. The parallel light is split into transmitted light (reference light) and reflected light (test light) by the beam splitter 100.

The test light reflected by the beam splitter 100 is reflected by the mirror 106, passes through the test unit 200 (the first reference lens 120, the medium 71, the test object 60, the medium 71, and the second reference lens 125), and then enters the beam splitter 101. On the other hand, the reference light having passed through the beam splitter 100 passes through a compensating plate 130, is reflected by the mirror 105, and then enters the beam splitter 101. The compensating plate 130 is a glass block made of the same material as that of the first reference lens 120 and the second reference lens 125.

The reference light and the test light are combined by the beam splitter 101 to form interference light. The formed interference light is detected by the detector 80 via the imaging lens 45. An interference signal produced by the detector 80 is sent to the computer 90. The detector 80 is located in a position conjugate with the position of the test object 60 with respect to the imaging lens 45.

A method for calculating the refractive index distribution of the test object 60 according to the present exemplary embodiment is described below. In the present exemplary embodiment, first, the user configures the test unit 200 by sandwiching the test object 60 between the first reference lens 120 and the second reference lens 125 via the medium 71, and the places the test unit 200 on the optical path of the test light. The computer 90 measures the first phase difference $\phi(\lambda_1)$ for the first wavelength $\lambda_1$, the first wavefront aberration $W(\lambda_1,x,y)$, the second phase difference $\phi(\lambda_2)$ for the second wavelength $\lambda_2$, and the second wavefront aberration $W(\lambda_2,x,y)$ according to the wavelength control of the monochromator 20 and the phase shift method using the driving mechanism of the mirror 105. In the present exemplary embodiment, the wavefront aberration $W(\lambda,x,y)$ and the phase difference $\phi(\lambda)$ can be measured at the same time. Furthermore, in the present exemplary embodiment, the computer 90 measures not the phase difference of the center of the test object 60 but the phase difference at coordinates (a,b) thereof. The phase difference $\phi(\lambda)$ and the wavefront aberration $W(\lambda,x,y)$ for the wavelength $\lambda$ are expressed by the following equations (28):

$$W(\lambda, x, y) = \frac{2\pi}{\lambda}[n_0(\lambda)L_A(x, y) + n^{medium}(\lambda)L_B(x, y) + n^{sample}(\lambda, x, y)L(x, y) + n^{medium}(\lambda)L_C(x, y) + n_0(\lambda)L_D(x, y) + \delta L - n_0(\lambda)(L + \delta L) - \Delta_0] - 2\pi m(\lambda)$$

$$\phi(\lambda) = W(\lambda, a, b)$$

(28)

Figure 4C:
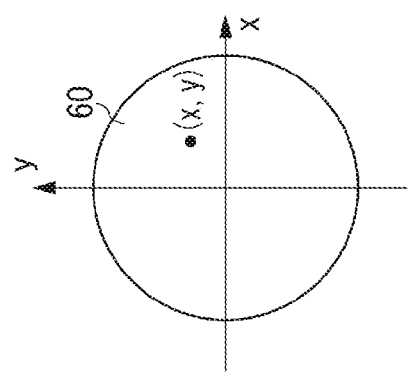

$L_A(x,y)$, $L_B(x,y)$, $L_C(x,y)$, and $L_D(x,y)$ denote respective geometric distances between constituent elements of the test unit 200 arranged along the light beam illustrated in FIG. 4C. FIG. 4C is drawn with the deflection of the light beam due to the refraction at each surface neglected. $L(x,y)$ denotes the thickness of the test object 60, $L_A(x,y)$ denotes the thickness of the first reference lens 120, and $L_D(x,y)$ denotes the thickness of the second reference lens 125.

The thicknesses $L_A(x,y)$, $L(x,y)$, and $L_D(x,y)$ are assumed to have been measured by another surface shape measuring method, and are defined here as known quantities. The distances $L_B(x,y)$ and $L_C(x,y)$ are gaps occurring due to a slight difference in surface shape between the first surface of the test object 60 and the second surface of the first reference lens 120 and between the second surface of the test object 60 and the first surface of the second reference lens 125, respectively. Since the thicknesses $L_A(x,y)$, $L(x,y)$, and $L_D(x,y)$ are known, the distances $L_B(x,y)$ and $L_C(x,y)$ are also known. $L+\delta L$ denotes the thickness of the compensating plate 130, which is also known. In the present exemplary embodiment, as expressed in the following equation (29), the sum of the distances $L_A(x,y)$, $L_B(x,y)$, $L(x,y)$, $L_C(x,y)$, and $L_D(x,y)$ is equal to the thickness of the test unit 200. The thickness of the test unit 200 is known.

$$L = L_A(x,y) + L_B(x,y) + L(x,y) + L_C(x,y) + L_D(x,y)$$

(29)

$n_0(\lambda)$ denotes the phase refractive index of each of the first reference lens 120, the second reference lens 125, and the compensating plate 130, which is known. In the present exemplary embodiment, the first reference lens 120, the second reference lens 125, and the compensating plate 130 are assumed to have the same phase refractive index and to be uniform in refractive index distribution. $n^{medium}(\lambda)$ denotes the phase refractive index of the medium 71. The computer 90 measures the temperature of the medium 71 using a thermometer (not illustrated), and calculates the phase refractive index $n^{medium}(\lambda)$ of the medium 71 based on the measured temperature. $\Delta_0$ denotes a difference in optical path length between the reference light and the test light when none of the first reference lens 120, the test object 60, the second reference lens 125, and the compensating plate 130 is arranged on the reference light optical path or the test light optical path.

If the integer $m(\lambda)$ in equation (28) is specified, the phase refractive index $n^{sample}(\lambda,a,b)$ is calculated from the phase difference $\phi(\lambda)$. Then, the refractive index distribution $GI(\lambda,x,y)$ is calculated based on the phase refractive index $n^{sample}(\lambda,a,b)$, the wavefront aberration $W(\lambda,x,y)$, and the equation (29), as expressed by the following equation (30):

$$GI(\lambda, x, y) = n^{sample}(\lambda, x, y) - n^{sample}(\lambda, a, b) \quad (30)$$

$$= n_0(\lambda) - n^{sample}(\lambda, a, b) + \frac{1}{L(x, y)}\left[\frac{\lambda}{2\pi}W(\lambda, x, y) + \right.$$

$$m(\lambda)\lambda + (n_0(\lambda) - n^{medium}(\lambda))(L_B(x, y) + L_C(x, y)) +$$

$$\left. n_0(\lambda)\delta L + \Delta_0 - \delta L \right]$$

However, since the phase refractive index of the test object 60 varies at the time of manufacturing by molding, it is difficult to specify the integer $m(\lambda)$. In other words, it is difficult to measure the phase refractive index of the test object 60 in a non-destructive manner. If the integer $m(\lambda)$ is erroneously specified as much as $\delta m$, the refractive index distribution $GI(\lambda,x,y)$ obtained from equation (30) contains an error of $\delta m/L(x,y)$.

In the present exemplary embodiment, the computer 90 specifies a difference $m(\lambda_2) - m(\lambda_1)$ between the integer $m(\lambda_1)$ for the first wavelength $\lambda_1$ and the integer $m(\lambda_2)$ for the second wavelength $\lambda_2$ instead of specifying the integer $m(\lambda)$, as in the first exemplary embodiment. Since it is easy to specify the difference $m(\lambda_2) - m(\lambda_1)$, the error of $\delta m/L(x,y)$ can be prevented from being mixed into the refractive index distribution $GI(\lambda,x,y)$.

The computer 90 calculates the phase-difference difference amount $\phi(\lambda_2) - \phi(\lambda_1)$ and the wavefront aberration difference amount $W(\lambda_2,x,y) - W(\lambda_1,x,y)$ as expressed by the following equations (31). Furthermore, the computer 90 calculates the physical quantity $F(\lambda_1,\lambda_2)$ from the phase-difference difference amount $\phi(\lambda_2) - \phi(\lambda_1)$ as expressed by the following equations (32).

$$W(\lambda_2, x, y) - W(\lambda_1, x, y) = 2\pi \left[ \left( \frac{n^{sample}(\lambda_2, x, y) - n^{sample}(\lambda_2, a, b)}{\lambda_2} - \right. \right. \quad (31)$$

$$\left. \frac{n^{sample}(\lambda_1, x, y) - n^{sample}(\lambda_1, a, b)}{\lambda_1} \right) L(x, y) +$$

$$\left( \frac{n^{sample}(\lambda_2, a, b) - n_0(\lambda_2)}{\lambda_2} - \frac{n^{sample}(\lambda_1, a, b) - n_0(\lambda_1)}{\lambda_1} \right)$$

$$L(x, y) - \left( \frac{n_0(\lambda_2) - n^{medium}(\lambda_2)}{\lambda_2} - \frac{n_0(\lambda_1) - n^{medium}(\lambda_1)}{\lambda_1} \right)$$

$$(L_B(x, y) + L_C(x, y)) - \left(\frac{n_0(\lambda_2)}{\lambda_2} - \frac{n_0(\lambda_1)}{\lambda_1}\right)\delta L -$$

$$\left. \left(\frac{1}{\lambda_2} - \frac{1}{\lambda_1}\right)(\Delta_0 - \delta L) \right] - 2\pi(m(\lambda_2) - m(\lambda_1))$$

$$\phi(\lambda_2) - \phi(\lambda_1) = W(\lambda_2, a, b) - W(\lambda_1, a, b)$$

$$F(\lambda_1, \lambda_2) = \frac{n^{sample}(\lambda_2, a, b) - n_0(\lambda_2)}{\lambda_2} - \frac{n^{sample}(\lambda_1, a, b) - n_0(\lambda_1)}{\lambda_1} \quad (32)$$

$$= \frac{1}{L(a, b)}\left[\frac{\phi(\lambda_2) - \phi(\lambda_1)}{2\pi} + (m(\lambda_2) - m(\lambda_1)) + \right.$$

$$\left(\frac{n_0(\lambda_2) - n^{medium}(\lambda_2)}{\lambda_2} - \frac{n_0(\lambda_1) - n^{medium}(\lambda_1)}{\lambda_1}\right)(L_B(a, b) +$$

$$\left. L_C(a, b)) + \left(\frac{n_0(\lambda_2)}{\lambda_2} - \frac{n_0(\lambda_1)}{\lambda_1}\right)\delta L + \left(\frac{1}{\lambda_2} - \frac{1}{\lambda_1}\right)(\Delta_0 - \delta L) \right]$$

Then, the computer 90 determines the phase refractive index $n^{sample}(\lambda_1,a,b) + \delta n(\lambda_1)$ of the test object 60 for the first wavelength $\lambda_1$ and the phase refractive index $n^{sample}(\lambda_2,a,b) + \delta n(\lambda_2)$ of the test object 60 for the second wavelength $\lambda_2$ in such a way as to satisfy the following equation (33):

$$\frac{n^{sample}(\lambda_2, a, b) + \delta n(\lambda_2) - n_0(\lambda_2)}{\lambda_2} - \quad (33)$$

$$\frac{n^{sample}(\lambda_1, a, b) + \delta n(\lambda_1) - n_0(\lambda_1)}{\lambda_1} = F(\lambda_1, \lambda_2)$$

$$\therefore \frac{\delta n(\lambda_2)}{\lambda_2} = \frac{\delta n(\lambda_1)}{\lambda_1}$$

Finally, the computer 90 computes the refractive index distribution $GI(\lambda_1,x,y)$ of the test object 60 as expressed by the following equation (34) using equation (17), equation (31), equation (32), and equation (33).

$$GI(\lambda_1, x, y) = n^{sample}(\lambda_1, x, y) - n^{sample}(\lambda_1, a, b) = \quad (34)$$

$$\frac{1}{\left(\frac{n^{sample}(\lambda_2, a, b) + \delta n(\lambda_2) - 1}{n^{sample}(\lambda_1, a, b) + \delta n(\lambda_1) - 1}\frac{1}{\lambda_2} - \frac{1}{\lambda_1}\right)L(x, y)}$$

$$\left[ \frac{W(\lambda_2, x, y) - W(\lambda_1, x, y)}{2\pi} + (m(\lambda_2) - m(\lambda_1)) + \right.$$

$$\left( \frac{n_0(\lambda_2) - n^{medium}(\lambda_2)}{\lambda_2} - \frac{n_0(\lambda_1) - n^{medium}(\lambda_1)}{\lambda_1} \right)$$

$$(L_B(x, y) + L_C(x, y)) - F(\lambda_1, \lambda_2)L(x, y) +$$

$$\left. \left(\frac{n_0(\lambda_2)}{\lambda_2} - \frac{n_0(\lambda_1)}{\lambda_1}\right)\delta L + \left(\frac{1}{\lambda_2} - \frac{1}{\lambda_1}\right)(\Delta_0 - \delta L) \right]$$

The present exemplary embodiment is configured on the premise that the shape $L(x,y)$ of the test object 60 is known. Even when the shape $L(x,y)$ of the test object 60 is unknown, if the distances $L_B(x,y)$ and $L_C(x,y)$, which are respective gaps between the first reference lens 120 and the test object 60 and between the test object 60 and the second reference lens 125, are so small as to be negligible with respect to the thickness of the test object 60, the third term in the right side of equation (34) can be regarded as zero. Thus, the following approximate expression (35) holds. Therefore, the effect of the shape error of the test object 60 can be neglected. The formula for calculating the refractive index distribution $GI(\lambda_1,x,y)$ in a case where the shape $L(x,y)$ of the test object 60 is unknown is expressed by the following equation (36).

$$\frac{\left(\frac{n_0(\lambda_2) - n^{medium}(\lambda_2)}{\lambda_2} - \frac{n_0(\lambda_1) - n^{medium}(\lambda_1)}{\lambda_1}\right)}{\left(\frac{n^{sample}(\lambda_2, a, b) + \delta n(\lambda_2) - 1}{n^{sample}(\lambda_1, a, b) + \delta n(\lambda_1) - 1}\frac{1}{\lambda_2} - \frac{1}{\lambda_1}\right)L(x, y)} \sim 0 \quad (35)$$

$$GI(\lambda_1, x, y) = n^{sample}(\lambda_1, x, y) - n^{sample}(\lambda_1, a, b) = \quad (36)$$

$$\frac{1}{\left(\frac{n^{sample}(\lambda_2, a, b) + \delta n(\lambda_2) - 1}{n^{sample}(\lambda_1, a, b) + \delta n(\lambda_1) - 1}\frac{1}{\lambda_2} - \frac{1}{\lambda_1}\right)} \times$$

$$(L - L_A(x, y) - L_D(x, y))$$

$$\left[ \frac{W(\lambda_2, x, y) - W(\lambda_1, x, y)}{2\pi} + (m(\lambda_2) - m(\lambda_1)) - \right.$$

$$F(\lambda_1, \lambda_2)(L - L_A(x, y) - L_D(x, y)) +$$

$$\left. \left(\frac{n_0(\lambda_2)}{\lambda_2} - \frac{n_0(\lambda_1)}{\lambda_2}\right)\delta L + \left(\frac{1}{\lambda_2} - \frac{1}{\lambda_1}\right)(\Delta_0 - \delta L) \right]$$

Alternatively, if two types of media are used as in the first exemplary embodiment, the shape error δL(x,y) can be removed. In the present exemplary embodiment, instead of immersing the test object 60 in two types of media as in the first exemplary embodiment, two types of media only need to be prepared as the media 71 that are applied between the first reference lens 120 and the test object 60 and between the test object 60 and the second reference lens 125. Then, if the above-described measurement is performed on the two types of media, the shape component can be removed as in the first exemplary embodiment.

According to a third exemplary embodiment of the present invention, a result of measurement of the refractive index distribution and a result of measurement of the refractive index obtained by the measuring apparatus or the measuring method described in the first exemplary embodiment or the second exemplary embodiment can be fed back to a method for manufacturing an optical element, such as a lens.

FIG. 6 illustrates an example of a procedure for manufacturing an optical element with molding.

An optical element is manufactured with a process of designing the optical element (S600), a process of designing a mold (S602), and a process of molding the optical element using the mold (S604). Then, the shape accuracy of the molded optical element is evaluated (S606). If the shape accuracy is insufficient (NG at S606), the mold is corrected (S607) to then perform molding again. If the shape accuracy is good (OK at S606), the optical performance of the optical element is evaluated (S608). The refractive index distribution measuring method or the refractive index distribution measuring apparatus according to the above-described exemplary embodiments can be incorporated into such a process of evaluating the optical performance (OK at S608), thus enabling accurately mass-producing optical elements with molding (S610).

If the optical performance is evaluated as low (NG at S608), the optical element is redesigned with an optical surface thereof corrected (S609).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-267153 filed Dec. 25, 2013, which is hereby incorporated by reference herein in its entirety.

What is claimed is:

1. A refractive index distribution measuring method comprising:
a phase difference measuring step of dividing light emitted from a light source into reference light and test light and causing the reference light to interfere with the test light, which test light has entered a test object and has passed through the test object, to measure a phase difference between the reference light and the test light;
a wavefront aberration measuring step of measuring a wavefront aberration of the test light; and
a calculation step of calculating a refractive index distribution of the test object based on the phase difference and the wavefront aberration,
wherein the phase difference measuring step includes measuring a first phase difference for a first wavelength and a second phase difference for a second wavelength different from the first wavelength,
wherein the wavefront aberration measuring step includes measuring a first wavefront aberration for the first wavelength and a second wavefront aberration for the second wavelength, and
wherein the calculation step includes calculating a phase-difference difference amount, which is a difference between the first phase difference and the second phase difference, calculating a wavefront aberration difference amount, which is a difference between the first wavefront aberration and the second wavefront aberration, and calculating the refractive index distribution of the test object based on the phase-difference difference amount and the wavefront aberration difference amount.

2. The refractive index distribution measuring method according to claim 1, wherein the wavefront aberration measuring step further includes calculating the first wavefront aberration as a difference between a transmitted wavefront of the test object for the first wavelength and a transmitted wavefront for the first wavelength of a reference test object having a specific refractive index distribution, and calculating the second wavefront aberration as a difference between a transmitted wavefront of the test object for the second wavelength and a transmitted wavefront for the second wavelength of the reference test object.

3. The refractive index distribution measuring method according to claim 1, wherein the phase difference measuring step further includes measuring the first phase difference for the first wavelength and the second phase difference for the second wavelength with the test object arranged in a first medium having a first refractive index, and measuring the first phase difference for the first wavelength and the second phase difference for the second wavelength with the test object arranged in a second medium having a second refractive index different from the first refractive index,
wherein the wavefront aberration measuring step further includes measuring the first wavefront aberration for the first wavelength and the second wavefront aberration for the second wavelength with the test object arranged in the first medium, and measuring the first wavefront aberration for the first wavelength and the second wavefront aberration for the second wavelength with the test object arranged in the second medium, and
wherein the calculation step further includes calculating a first phase-difference difference amount, which is a difference between the first phase difference and the second phase difference measured with the test object arranged in the first medium, calculating a second phase-difference difference amount, which is a difference between the first phase difference and the second phase difference measured with the test object arranged in the second medium, calculating a first wavefront aberration difference amount, which is a difference between the first wavefront aberration and the second wavefront aberration measured with the test object arranged in the first medium, calculating a second wavefront aberration difference amount, which is a difference between the first wavefront aberration and the second wavefront aberration measured with the test object arranged in the second medium, and calculating the refractive index distribution of the test object with a shape component of the test object removed based on the first phase-difference difference amount, the second phase-difference difference amount, the first wavefront aberration difference amount, and the second wavefront aberration difference amount.

4. The refractive index distribution measuring method according to claim 1, wherein the calculation step further includes calculating the refractive index distribution of the test object based on a known shape of the test object, the phase-difference difference amount, and the wavefront aberration difference amount.

5. The refractive index distribution measuring method according to claim 1, further comprising a step of measuring a waveform dependency of the phase difference between the reference light and the test light with a medium having a group refractive index equal to a group refractive index of the test object for a specific wavelength arranged on optical paths of the reference light and the test light, and calculating the first wavelength and the second wavelength to make the first phase difference and the second phase difference equal to each other based on the waveform dependency of the phase difference between the reference light and the test light.

6. The refractive index distribution measuring method according to claim 1, further comprising configuring a test unit by arranging a first reference lens, a shape and a refractive index of which are known, and a second reference lens, a shape and a refractive index of which are known, in such a way as to sandwich the test object between the first reference lens and the second reference lens,
wherein the phase difference measuring step further includes measuring the first phase difference for the first wavelength and the second phase difference for the second wavelength by causing the reference light and the test light, which has passed through the test unit, to interfere with each other,
wherein the wavefront aberration measuring step further includes measuring the first wavefront aberration for the first wavelength and the second wavefront aberration for the second wavelength of the test light having passed through the test unit, and
wherein the calculation step further includes calculating the phase-difference difference amount, which is a difference between the first phase difference and the second phase difference, calculating the wavefront aberration difference amount, which is a difference between the first wavefront aberration and the second wavefront aberration, and calculating the refractive index distribution of the test object based on the shape and the refractive index of the first reference lens, the shape and the refractive index of the second reference lens, the phase-difference difference amount, and the wavefront aberration difference amount.

7. The refractive index distribution measuring method according to claim 6, wherein the phase difference measuring step further includes measuring the first phase difference for the first wavelength and the second phase difference for the second wavelength with a first medium having a first refractive index arranged between the first and second reference lenses and the test object, and measuring the first phase difference for the first wavelength and the second phase difference for the second wavelength with a second medium having a second refractive index different from the first refractive index arranged between the first and second reference lenses and the test object,
wherein the wavefront aberration measuring step further includes measuring the first wavefront aberration for the first wavelength and the second wavefront aberration for the second wavelength with the first medium arranged between the first and second reference lenses and the test object, and measuring the first wavefront aberration for the first wavelength and the second wavefront aberration for the second wavelength with the second medium arranged between the first and second reference lenses and the test object, and
wherein the calculation step further includes calculating a first phase-difference difference amount, which is a difference between the first phase difference and the second phase difference measured with the first medium arranged between the first and second reference lenses and the test object, calculating a second phase-difference difference amount, which is a difference between the first phase difference and the second phase difference measured with the second medium arranged between the first and second reference lenses and the test object, calculating a first wavefront aberration difference amount, which is a difference between the first wavefront aberration and the second wavefront aberration measured with the first medium arranged between the first and second reference lenses and the test object, calculating a second wavefront aberration difference amount, which is a difference between the first wavefront aberration and the second wavefront aberration measured with the second medium arranged between the first and second reference lenses and the test object, and calculating the refractive index distribution of the test object with a shape component of the test object removed based on the first phase-difference difference amount, the second phase-difference difference amount, the first wavefront aberration difference amount, and the second wavefront aberration difference amount.

8. A method for manufacturing an optical element, the method comprising:
molding the optical element; and
evaluating an optical performance of the molded optical element by measuring a refractive index distribution of the optical element using the refractive index distribution measuring method according to claim 1.

9. A refractive index distribution measuring apparatus comprising:
a light source;
a phase difference measuring unit configured to divide light emitted from the light source into reference light and test light, to cause the reference light to interfere with the test light, which test light has entered a test object and has passed through the test object, and to measure a phase difference between the reference light and the test light;
a wavefront aberration measuring unit configured to measure a wavefront aberration of the test light; and
a calculation unit configured to calculate a refractive index distribution of the test object based on the phase difference and the wavefront aberration,
wherein the phase difference measuring unit measures a first phase difference for a first wavelength and a second phase difference for a second wavelength different from the first wavelength,
wherein the wavefront aberration measuring unit measures a first wavefront aberration for the first wavelength and a second wavefront aberration for the second wavelength, and
wherein the calculation unit calculates a phase-difference difference amount, which is a difference between the first phase difference and the second phase difference, calculates a wavefront aberration difference amount, which is a difference between the first wavefront aberration and the second wavefront aberration, and calculates the refractive index distribution of the test object based on the phase-difference difference amount and the wavefront aberration difference amount.

10. The refractive index distribution measuring apparatus according to claim 9, wherein the wavefront aberration measuring unit measures a transmitted wavefront of the test object for the first wavelength and a transmitted wavefront for the first wavelength of a reference test object having a specific refractive index distribution to calculate the first wavefront aberration as a difference between the transmitted wavefront of the test object for the first wavelength and the transmitted wavefront of the reference test object for the first wavelength, and measures a transmitted wavefront of the test object for the second wavelength and a transmitted wavefront of the reference test object for the second wavelength to calculate the second wavefront aberration as a difference between the transmitted wavefront of the test object for the second wavelength and the transmitted wavefront of the reference test object for the second wavelength.

11. The refractive index distribution measuring apparatus according to claim 9, wherein the phase difference measuring unit measures the first phase difference for the first wavelength and the second phase difference for the second wavelength with the test object arranged in a first medium having a first refractive index, and measures the first phase difference for the first wavelength and the second phase difference for the second wavelength with the test object arranged in a second medium having a second refractive index different from the first refractive index,
wherein the wavefront aberration measuring unit measures the first wavefront aberration for the first wavelength and the second wavefront aberration for the second wavelength with the test object arranged in the first medium, and measures the first wavefront aberration for the first wavelength and the second wavefront aberration for the second wavelength with the test object arranged in the second medium, and
wherein the calculation unit calculates a first phase-difference difference amount, which is a difference between the first phase difference and the second phase difference measured with the test object arranged in the first medium, calculates a second phase-difference difference amount, which is a difference between the first phase difference and the second phase difference measured with the test object arranged in the second medium, calculates a first wavefront aberration difference amount, which is a difference between the first wavefront aberration and the second wavefront aberration measured with the test object arranged in the first medium, calculates a second wavefront aberration difference amount, which is a difference between the first wavefront aberration and the second wavefront aberration measured with the test object arranged in the second medium, and calculates the refractive index distribution of the test object with a shape component of the test object removed based on the first phase-difference difference amount, the second phase-difference difference amount, the first wavefront aberration difference amount, and the second wavefront aberration difference amount.

12. The refractive index distribution measuring apparatus according to claim 9, wherein the calculation unit calculates the refractive index distribution of the test object based on a known shape of the test object, the phase-difference difference amount, and the wavefront aberration difference amount.

13. The refractive index distribution measuring apparatus according to claim 9, further comprising a unit configured to measure a waveform dependency of the phase difference between the reference light and the test light with a medium having a group refractive index equal to a group refractive index of the test object for a specific wavelength arranged on optical paths of the reference light and the test light, and to calculate the first wavelength and the second wavelength to make the first phase difference and the second phase difference equal to each other based on the waveform dependency of the phase difference between the reference light and the test light.

14. The refractive index distribution measuring apparatus according to claim 9, further comprising a test unit including a first reference lens, a shape and a refractive index of which are known, and a second reference lens, a shape and a refractive index of which are known, arranged in such a way as to sandwich the test object between the first reference lens and the second reference lens,
wherein the phase difference measuring unit measures the first phase difference for the first wavelength and the second phase difference for the second wavelength by causing the reference light and the test light, which has passed through the test unit, to interfere with each other,
wherein the wavefront aberration measuring unit measures the first wavefront aberration for the first wavelength and the second wavefront aberration for the second wavelength of the test light having passed through the test unit, and
wherein the calculation unit calculates the phase-difference difference amount, which is a difference between the first phase difference and the second phase difference, calculates the wavefront aberration difference amount, which is a difference between the first wavefront aberration and the second wavefront aberration, and calculates the refractive index distribution of the test object based on the shape and the refractive index of the first reference lens, the shape and the refractive index of the second reference lens, the phase-difference difference amount, and the wavefront aberration difference amount.

15. The refractive index distribution measuring apparatus according to claim 14, wherein the phase difference measuring unit measures the first phase difference for the first wavelength and the second phase difference for the second wavelength with a first medium having a first refractive index arranged between the first and second reference lenses and the test object, and measures the first phase difference for the first wavelength and the second phase difference for the second wavelength with a second medium having a second refractive index different from the first refractive index arranged between the first and second reference lenses and the test object,
wherein the wavefront aberration measuring unit measures the first wavefront aberration for the first wavelength and the second wavefront aberration for the second wavelength with the first medium arranged between the first and second reference lenses and the test object, and measures the first wavefront aberration for the first wavelength and the second wavefront aberration for the second wavelength with the second medium arranged between the first and second reference lenses and the test object, and
wherein the calculation unit calculates a first phase-difference difference amount, which is a difference between the first phase difference and the second phase difference measured with the first medium arranged between the first and second reference lenses and the test object, calculates a second phase-difference difference amount, which is a difference between the first phase difference and the second phase difference measured with the second medium arranged between the first and second reference lenses and the test object, calculates a first wavefront aberration difference amount, which is a difference between the first wavefront aberration and the second wavefront aberration measured with the first medium arranged between the first and second reference lenses and the test object, calculates a second wavefront aberration difference amount, which is a difference between the first wavefront aberration and the second wavefront aberration measured with the second medium arranged between the first and second reference lenses and the test object, and calculates the refractive index distribution of the test object with a shape component of the test object removed based on the first phase-difference difference amount, the second phase-difference difference amount, the first wavefront aberration difference amount, and the second wavefront aberration difference amount.

16. A refractive index measuring apparatus comprising:

a light source;

a phase difference measuring unit configured to divide light emitted from the light source into reference light and test light, to cause the reference light to interfere with the test light, which test light has entered a test object and has passed through the test object, and to measure a phase difference between the reference light and the test light;

a wavefront aberration measuring unit configured to measure a wavefront aberration of the test light; and a calculation unit configured to calculate a refractive index distribution of the test object based on the phase difference and the wavefront aberration, wherein the phase difference measuring unit measures a first phase difference for a first wavelength and a second phase difference for a second wavelength different from the first wavelength, wherein the wavefront aberration measuring unit measures a first wavefront aberration for the first wavelength and a second wavefront aberration for the second wavelength, and wherein the calculation unit calculates a phase-difference difference amount, which is a difference between the first phase difference and the second phase difference, calculates a wavefront aberration difference amount, which is a difference between the first wavefront aberration and the second wavefront aberration, calculates the refractive index distribution of the test object based on the phase-difference difference amount and the wavefront aberration difference amount, and calculates a phase refractive index of the test object for the first wavelength based on the refractive index distribution of the test object and the first wavefront aberration.

* * * * *